(12) United States Patent  
Yamazaki et al.

(10) Patent No.: US 11,845,194 B2
(45) Date of Patent: Dec. 19, 2023

(54) ROBOT SYSTEM AND WORKPIECE PICKING METHOD

(71) Applicants: FANUC CORPORATION, Yamanashi (JP); Preferred Networks, Inc., Tokyo (JP)

(72) Inventors: Takashi Yamazaki, Yamanashi (JP); Daisuke Okanohara, Tokyo (JP); Eiichi Matsumoto, Tokyo (JP)

(73) Assignees: FANUC CORPORATION, Yamanashi (JP); PREFERRED NETWORKS, INC., Tokyo (JP)

( * ) Notice: Subject to any disclaimer, the term of this patent is extended or adjusted under 35 U.S.C. 154(b) by 858 days.

(21) Appl. No.: 16/117,612

(22) Filed: Aug. 30, 2018

(65) Prior Publication Data

US 2019/0091869 A1 Mar. 28, 2019

(30) Foreign Application Priority Data

Sep. 25, 2017 (JP) ................. 2017-183593

(51) Int. Cl.
*B25J 15/08* (2006.01)
*B25J 9/16* (2006.01)

(52) U.S. Cl.
CPC ............. *B25J 9/1697* (2013.01); *B25J 9/163* (2013.01); *B25J 9/1664* (2013.01); *B25J 15/08* (2013.01)

(58) Field of Classification Search
CPC ........ B25J 9/1697; B25J 9/163; B25J 9/1664; B25J 15/08; B25J 9/1679; B25J 9/0081; B25J 13/088; G05B 2219/39311; G05B 2219/40053
See application file for complete search history.

(56) References Cited

U.S. PATENT DOCUMENTS

| 9,002,098 | B1 | 4/2015 | Chelian et al. |
| 9,302,391 | B2 | 4/2016 | Iio et al. |
| 10,058,995 | B1* | 8/2018 | Sampedro .............. B25J 9/0084 |

(Continued)

FOREIGN PATENT DOCUMENTS

| CN | 103659838 | 3/2014 |
| CN | 104057447 | 9/2014 |

(Continued)

OTHER PUBLICATIONS

Notification of Reasons for Refusal dated Dec. 10, 2019 in Japanese Patent Application No. 2017-183593.

(Continued)

*Primary Examiner* — Basil T. Jos
(74) *Attorney, Agent, or Firm* — Wenderoth, Lind & Ponack, L.L.P.

(57) ABSTRACT

To select a picking position of a workpiece in a simpler method. A robot system includes a three-dimensional measuring device for generating a range image of a plurality of workpieces, a robot having a hand for picking up at least one of the plurality of workpieces, a display part for displaying the range image generated by the three-dimensional measuring device, and a reception part for receiving a teaching of a picking position for picking-up by the hand on the displayed range image. The robot picks up at least one of the plurality of workpieces by the hand on the basis of the taught picking position.

22 Claims, 10 Drawing Sheets

(56) References Cited

U.S. PATENT DOCUMENTS

| | | | |
|---|---|---|---|
| 2015/0003678 A1* | 1/2015 | Watanabe | G06T 19/20 |
| | | | 382/103 |
| 2017/0028553 A1 | 2/2017 | Tsuda et al. | |
| 2017/0028562 A1 | 2/2017 | Yamazaki et al. | |
| 2017/0334066 A1* | 11/2017 | Levine | G06N 3/084 |
| 2018/0250821 A1* | 9/2018 | Shimodaira | G06F 30/20 |
| 2019/0084151 A1* | 3/2019 | Bai | B25J 9/1612 |
| 2020/0094406 A1 | 3/2020 | Kusano et al. | |

FOREIGN PATENT DOCUMENTS

| | | |
|---|---|---|
| CN | 106393102 | 2/2017 |
| CN | 106826809 | 6/2017 |
| DE | 102013012068 | 1/2014 |
| DE | 102016009030 | 2/2017 |
| EP | 2 923 806 | 9/2015 |
| JP | 10-180668 | 7/1998 |
| JP | 2013-052490 | 3/2013 |
| JP | 2015-100874 | 6/2015 |
| JP | 2015-182213 | 10/2015 |
| JP | 2017-30135 | 2/2017 |
| JP | 2017-47505 | 3/2017 |
| JP | 2017-64910 | 4/2017 |
| JP | 2017-124450 | 7/2017 |

OTHER PUBLICATIONS

Matsumoto et al., "End-to-End Learning of Object Grasp Poses in the Amazon Robotics Challenge," Advances on Robotic Item Picking, 2020, pp. 63-72.

Notification of Reasons for Refusal dated Feb. 25, 2020 in Japanese Patent Application No. 2017-183593 with English-language translation.

Keiko, N., "The most advanced deep learning technique of the world (PFN), the estimation of the position of an object," Nikkei Robotics, 2016, pp. 16-22.

Office Action dated Oct. 13, 2020 in German Patent Application No. 102018215826.6.

Vijay Badrinarayanan, Alex Kendall, Roberto Cipolla, "SegNet: A Deep Convolutional Encoder-Decoder Architecture for Image Segmentation", [online] Aug. 10, 2016 (Heisei 28) [Search Date: Sep. 10, 2017 (Heisei 29)], Internet <URL: https://arxiv.org/pdf/1511.00561.pdf>.

Office Action dated Aug. 24, 2022 in Chinese Patent Application No. 201811101031.0.

Eiichi Matsumoto et al., "End-to-End Learning of Object Grasp Poses in the Amazon Robotics Challenge", Jun. 13, 2017, ICRA 2017 Workshop.

* cited by examiner

80: POINT GROUP INFORMATION FOR

90: CANDIDATE PICKING POSITION

70: RANGE IMAGE

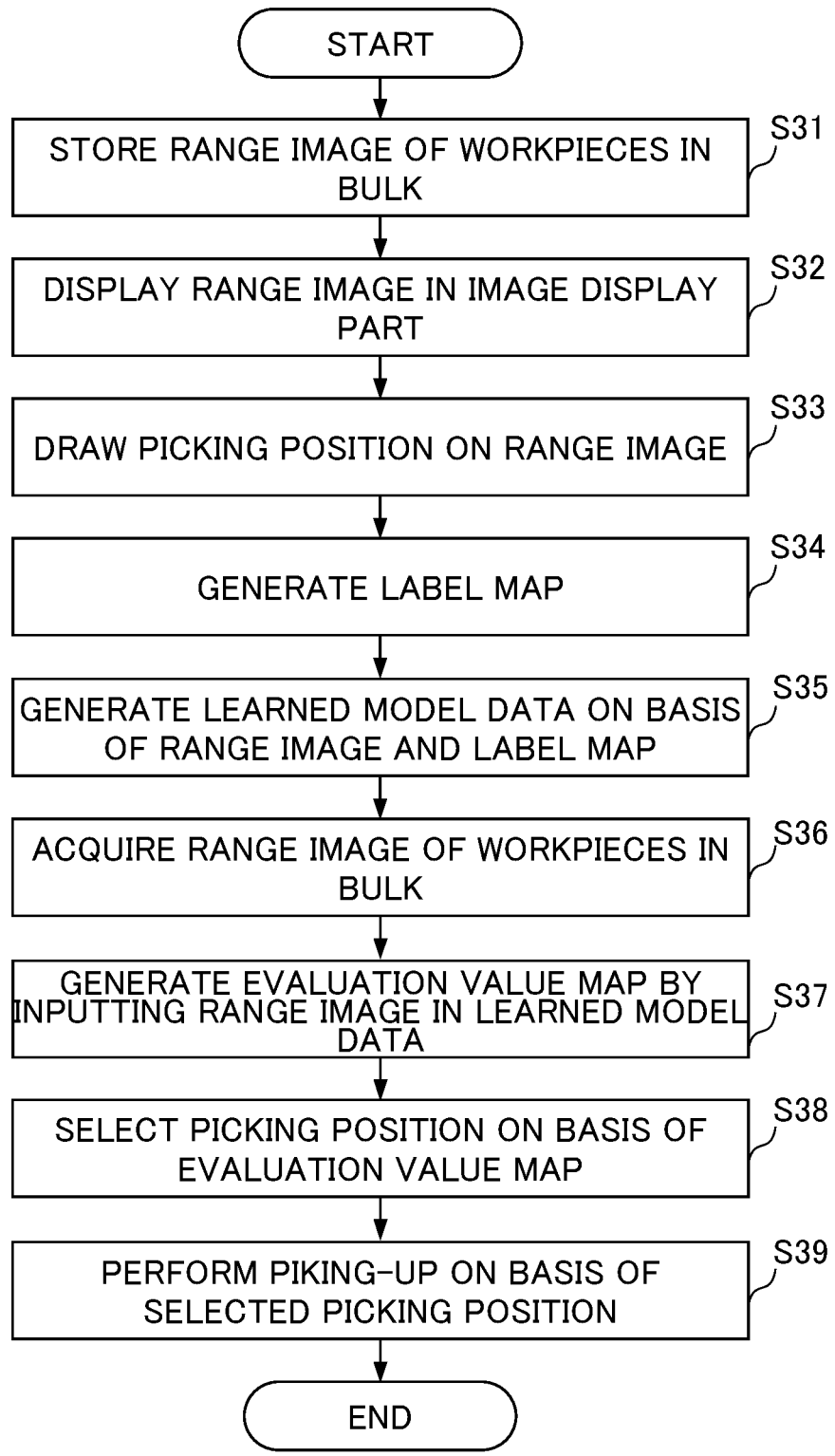

ROBOT SYSTEM AND WORKPIECE PICKING METHOD

This application is based on and claims the benefit of priority from Japanese Patent Application No. 2017-183593, filed on 25 Sep. 2017, the content of which is incorporated herein by reference.

BACKGROUND OF THE INVENTION

Field of the Invention

The present invention relates to a robot system and a workpiece picking method for performing processing for picking up a workpiece by a robot.

Related Art

Conventionally, a range image of workpieces which is obtained by measurement by a three-dimensional measuring device including a range image sensor is used to perform teaching, in order to detect a picking position of a workpiece. For example, a method based on CAD (Computer-Aided Design) matching or a method of performing search based on set parameters is generally used as a method of performing teaching by use of a range image. The range image herein means an image which is obtained by measuring surfaces of objects to be measured (workpieces), and in which each pixel on a photographed image has depth information obtained from the three-dimensional measuring device. That is, each pixel on the range image has three-dimensional coordinate information in the three-dimensional coordinate system included in the three-dimensional measuring device.

In the method based on CAD matching, firstly, CAD data corresponding to the shape of a workpiece is generated. Then, the picking position of the workpiece enabled to be gripped by the hand of a robot is taught to the CAD data. A position matched to the CAD data is searched for in the range image obtained by measuring the workpiece. Then, the position corresponding to the picking position of the workpiece taught to the CAD data is selected in the matched positions. The hand of the robot is controlled in gripping on the basis of the selection result, thereby enabling to realize the picking-up of the workpiece. For example, Patent Document 1 discloses the technique of picking up workpieces in bulk by teaching a picking position of a workpiece, by use of such CAD data.

In the case of search based on set parameters, search algorithm is selected on the basis of the experience of the person giving a teaching, to search for the picking position of the workpiece enabled to be gripped by the hand of the robot, and whether or not the workpiece is detected on the actual range image is checked while the parameters of the selected search algorithm are adjusted, thereby enabling to realize the picking-up of the workpiece.

Patent Document 1: Japanese Unexamined Patent Application, Publication No. 2017-124450

SUMMARY OF THE INVENTION

As described above, the method based on CAD data matching is widely used. However, in the method, it is necessary to teach a CAD model a plurality of picking positions in which the workpieces are able to be gripped by the hand, and thus it takes time to teach the positions. Although the matching requires a CAD model, a CAD model cannot be generated for irregular workpieces, actually. In the case where an object to be picked up is a workpiece in process, not a finished product, it is necessary to additionally generate the CAD model of the workpiece in process to be picked up.

While in the case of search on a range image based on parameters without using CAD data, it is necessary to select search algorithm in consideration of the relation between the workpiece and the hand on the basis of the experience of the person giving a teaching as described above. Accordingly, a picking position of a workpiece is not easily selected in such conventional methods in a robot system.

The object of the present invention is to provide a robot system and a workpiece picking method for selecting a picking position of a workpiece in a simpler method.

(1) A robot system (for example, a robot system 1a described below) according to the present invention includes a three-dimensional measuring device (for example, a three-dimensional measuring device 40 described below) for generating a range image of a plurality of workpieces (for example, workpieces 50 described below), a robot (for example, a robot 30 described below) having a hand for picking up at least one of the plurality of workpieces, a display part (for example, a display part 12 described below) for displaying the range image generated by the three-dimensional measuring device, and a reception part (for example, an operation reception part 13 described below) for receiving a teaching of a picking position for picking-up by the hand on the displayed range image. The robot picks up at least one of the plurality of workpieces by the hand on the basis of the taught picking position, in the robot system.

(2) In the robot system according to (1), the display part may draw the taught picking position on the displayed range image.

(3) The robot system according to (1) or (2) may include a picking position selection part (for example, a selection processing part 11 described below) for selecting a new picking position, by storing three-dimensional point group information of the taught picking position and a periphery of the taught picking position as information for search, and searching the range image by use of the information for search. The robot may pick up each of the workpieces by the hand at the new picking position selected by the picking position selection part.

(4) Another robot system (for example, a robot system 1a described below) according to the present invention includes a three-dimensional measuring device (for example, a three-dimensional measuring device 40 described below) for generating a range image of a plurality of workpieces (for example, workpieces 50 described below), a robot (for example, a robot 30 described below) having a hand for picking up at least one of the plurality of workpieces, a display part (for example, a display part 12 described below) for displaying the range image generated by the three-dimensional measuring device, and a picking position taught on the range image, a reception part (for example, an operation reception part 13 described below) for receiving a teaching of the picking position for picking-up by the hand on the displayed range image, and a learning part (for example, a learning part 14 described below) for performing machine learning, by using three-dimensional point group information of the taught picking position and a periphery of the taught picking position as input data, and using as a label at least one of an evaluation value based on the teaching to the three-dimensional point group information used as the input data and an evaluation value according to success or failure in the picking-up, and thereby for building a learning model for outputting an evaluation value of the three-dimensional point group information input as the input data. The robot picks up at least one of the plurality of workpieces by the hand on the basis of the taught picking position.

(5) Another robot system (for example, a robot system 1a described below) according to the present invention includes a three-dimensional measuring device (for example, a three-dimensional measuring device 40 described below) for generating a range image of a plurality of workpieces (for example, workpieces 50 described below), a robot (for example, a robot 30 described below) having a hand for picking up at least one of the plurality of workpieces, a display part (for example, a display part 12 described below) for displaying the range image generated by the three-dimensional measuring device, and a picking position taught on the range image, a reception part (for example, an operation reception part 13 described below) for receiving a teaching of the picking position for picking-up by the hand on the displayed range image, a learning part (for example, a learning part 14 described below) for performing machine learning, by using three-dimensional point group information of the taught picking position and a periphery of the taught picking position as input data, and using as a label at least one of an evaluation value based on the teaching to the three-dimensional point group information used as the input data and an evaluation value according to success or failure in the picking-up, and thereby for building a learning model for outputting an evaluation value of the three-dimensional point group information input as the input data, and a picking position selection part (for example, a selection processing part 11 described below) for clipping out a predetermined-region range image from the range image, for inputting three-dimensional point group information of the clipped-out range image in the learning model as the input data, thereby obtaining the output evaluation value of the three-dimensional point group information, and for selecting a new picking position on the basis of the evaluation value. The robot picks up at least one of the plurality of workpieces by the hand on the basis of the taught picking position, and picks up each of the workpieces by the hand at the new picking position selected by the picking position selection part.

(6) Another robot system (for example, a robot system 1b described below) according to the present invention includes a three-dimensional measuring device (for example, a three-dimensional measuring device 40 described below) for generating a range image of a plurality of workpieces (for example, workpieces 50 described below), a robot (for example, a robot 30 described below) having a hand for picking up at least one of the plurality of workpieces, an estimation part (for example, an estimation processing part 143 described below) for estimating a picking position of at least one of the plurality of workpieces to be picked up by the hand on the basis of the range image generated by the three-dimensional measuring device, and thereby for generating and outputting an evaluation value map including at least one evaluation value, and a position selection part (for example, a picking position selection part 153 described below) for selecting a picking position of at least one of the plurality of workpieces to be picked up by the hand on the basis of the evaluation value map output by the estimation part. The robot picks up at least one of the plurality of workpieces by the hand on the basis of the picking position selected by the position selection part.

(7) Another robot system (for example, a robot system 1b described below) according to the present invention includes a three-dimensional measuring device (for example, a three-dimensional measuring device 40 described below) for generating a range image of a plurality of workpieces (for example, workpieces 50 described below), a robot (for example, a robot 30 described below) having a hand for picking up at least one of the plurality of workpieces, a teacher data storage part (for example, a teacher data storage part 151 described below) for storing the range image generated by the three-dimensional measuring device as teacher data for machine learning, a display part (for example, a display part 12 described below) for displaying the range image stored in the teacher data storage part, a reception part (for example, an operation reception part 13 described below) for receiving a teaching of at least one teaching position based on the range image displayed by the display part, an annotation processing part (for example, an annotation processing part 152 described below) for generating a label map indicating the at least one teaching position on the basis of the teaching position received by the reception part, and storing the label map and the range image stored in the teacher data storage part in association with each other as a data set in the teacher data storage part, a learning processing part (for example, a learning processing part 141 described below) for performing machine learning by using the data set stored in the teacher data storage part as input, and thereby for outputting a learned model, a learned model storage part (for example, a learned model storage part 142 described below) for storing the learned model output by the learning processing part, an estimation part (for example, an estimation processing part 143 described below) for estimating, on the basis of the learned model stored in the learned model storage part and a range image of a plurality of new workpieces newly generated by the three-dimensional measuring device, a picking position of at least one of the plurality of new workpieces to be picked up by the hand, and thereby for generating and outputting an evaluation value map including at least one evaluation value, and a position selection part (for example, a picking position selection part 153 described below) for selecting a picking position of at least one of the plurality of new workpieces to be picked up by the hand on the basis of the evaluation value map output by the estimation part. The robot picks up at least one of the plurality of new workpieces by the hand on the basis of the picking position selected by the position selection part.

(8) A workpiece picking method according to the present invention is performed by a robot system (for example, a robot system 1a described below) including a three-dimensional measuring device (for example, a three-dimensional measuring device 40 described below) for generating a range image of a plurality of workpieces (for example, workpieces 50 described below), and a robot (for example, a robot 30 described below) having a hand for picking up at least one of the plurality of workpieces. The workpiece picking method includes the steps of displaying the range image generated by the three-dimensional measuring device, and receiving a teaching of a picking position for picking-up by the hand on the displayed range image. The robot picks up at least one of the plurality of workpieces by the hand on the basis of the taught picking position.

(9) Another workpiece picking method according to the present invention is performed by a robot system (for example, a robot system 1a described below) including a three-dimensional measuring device (for example, a three-dimensional measuring device 40 described below) for generating a range image of a plurality of workpieces (for example, workpieces 50 described below), and a robot (for example, a robot 30 described below) having a hand for picking up at least one of the plurality of workpieces. The workpiece picking method includes the steps of displaying the range image generated by the three-dimensional measuring device, and a picking position taught on the range image, receiving a teaching of the picking position for picking-up by the hand on the displayed range image, and performing machine learning, by using three-dimensional point group information of the taught picking position and a periphery of the taught picking position as input data, and using as a label at least one of an evaluation value based on the teaching to the three-dimensional point group information used as the input data and an evaluation value according to success or failure in the picking-up, thereby building a learning model for outputting an evaluation value of the three-dimensional point group information input as the input data. The robot picks up at least one of the plurality of workpieces by the hand on the basis of the taught picking position.

(10) Another workpiece picking method according to the present invention is performed by a robot system (for example, a robot system 1a described below) including a three-dimensional measuring device (for example, a three-dimensional measuring device 40 described below) for generating a range image of a plurality of workpieces (for example, workpieces 50 described below), and a robot (for example, a robot 30 described below) having a hand for picking up at least one of the plurality of workpieces. The workpiece picking method includes a display step of displaying the range image generated by the three-dimensional measuring device, and a picking position taught on the range image, a reception step of receiving a teaching of a picking position for picking-up by the hand on the displayed range image, a learning step of performing machine learning, by using three-dimensional point group information of the taught picking position and a periphery of the taught picking position as input data, and using as a label at least one of an evaluation value based on the teaching to the three-dimensional point group information used as the input data and an evaluation value according to success or failure in the picking-up, and thereby building a learning model for outputting an evaluation value of the three-dimensional point group information input as the input data, and a picking position selection step of clipping out a predetermined-region range image from the range image, inputting three-dimensional point group information of the clipped-out range image in the learning model as the input data, thereby obtaining the output evaluation value of the three-dimensional point group information, and selecting a new picking position on the basis of the evaluation value. The robot picks up at least one of the plurality of workpieces by the hand on the basis of the taught picking position, and picks up each of the workpieces by the hand at the new picking position selected in the picking position selection step.

(11) Another workpiece picking method according to the present invention is performed by a robot system (for example, a robot system 1b described below) including a three-dimensional measuring device (for example, a three-dimensional measuring device 40 described below) for generating a range image of a plurality of workpieces (for example, workpieces 50 described below), and a robot (for example, a robot 30 described below) having a hand for picking up at least one of the plurality of workpieces. The workpiece picking method includes an estimation step of estimating a picking position of at least one of the plurality of workpieces to be picked up by the hand on the basis of the range image generated by the three-dimensional measuring device, thereby generating and outputting an evaluation value map including at least one evaluation value, and a position selection step of selecting a picking position of at least one of the plurality of workpieces to be picked up by the hand on the basis of the evaluation value map output in the estimation step. The robot picks up at least one of the plurality of workpieces by the hand on the basis of the picking position selected in the position selection step.

(12) Another workpiece picking method according to the present invention is performed by a robot system (for example, a robot system 1b described below) including a three-dimensional measuring device (for example, a three-dimensional measuring device 40 described below) for generating a range image of a plurality of workpieces (for example, workpieces 50 described below), and a robot (for example, a robot 30 described below) having a hand for picking up at least one of the plurality of workpieces. The workpiece picking method includes a teacher data storage step of storing the range image generated by the three-dimensional measuring device as teacher data for machine learning in a teacher data storage part, a display step of displaying the range image stored in the teacher data storage part, a reception step of receiving a teaching of at least one teaching position based on the range image displayed in the display step, an annotation processing step of generating a label map indicating the at least one teaching position on the basis of the teaching position received in the reception step, and storing the label map and the range image stored in the teacher data storage part in association with each other as a data set in the teacher data storage part, a learning processing step of performing machine learning by using the data set stored in the teacher data storage part as input, thereby outputting a learned model, a learned model storage step of storing in a learned model storage part the learned model output in the learning processing step, an estimation step of estimating, on the basis of the learned model stored in the learned model storage part and a range image of a plurality of new workpieces newly generated by the three-dimensional measuring device, a picking position of at least one of the plurality of new workpieces to be picked up by the hand, thereby generating and outputting an evaluation value map including at least one evaluation value, and a position selection step of selecting a picking position of at least one of the plurality of new workpieces to be picked up by the hand on the basis of the evaluation value map output in the estimation step. The robot picks up at least one of the plurality of new workpieces by the hand on the basis of the picking position selected in the position selection step.

The present invention enables to select a picking position of a workpiece in a simpler method.

BRIEF DESCRIPTION OF THE DRAWINGS

FIG. 11 is a flowchart indicating the operation in the second embodiment of the present invention.

DETAILED DESCRIPTION OF THE INVENTION

Some embodiments of the present invention will be described below in detail with reference to the diagrams. The following descriptions are about two embodiments of a first embodiment and a second embodiment. The configuration for selecting a workpiece picking position is common to the respective embodiments. However, the first embodiment and the second embodiment are different in that pre-processing such as image matching processing and image clipping processing is performed in the first embodiment, whereas such pre-processing is omitted in the second embodiment. The first embodiment is described in detail firstly, and thereafter the second embodiment is described with respect to difference from the first embodiment.

<Overall Configuration of Embodiment>

Figure 1:
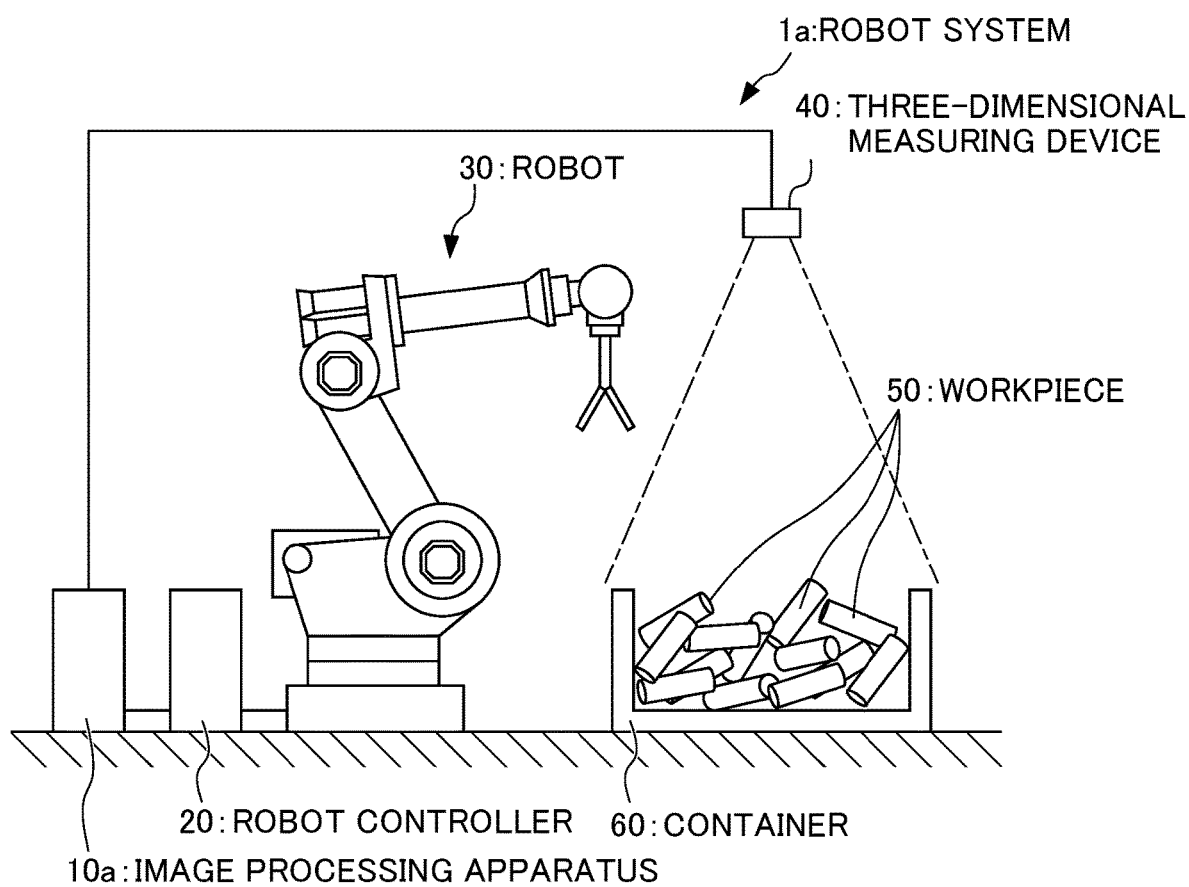
FIG. 1 is a schematic diagram illustrating an overall configuration of each embodiment of the present invention.

The configuration of a robot system 1a according to the first embodiment is described with reference to FIG. 1. The robot system 1a includes an image processing apparatus 10a, a robot controller 20, a robot 30, a three-dimensional measuring device 40, a plurality of workpieces 50, and a container 60. The image processing apparatus 10a is communicably connected to the robot controller 20 and the three-dimensional measuring device 40. The robot controller 20 is communicably connected not only to the image processing apparatus 10a, but also to the robot 30.

Firstly, the outline of the robot system 1a is described. In the robot system 1a, a range image is generated by measuring the plurality of workpieces 50 placed in a disordered state including a bulk state by the three-dimensional measuring device 40.

Then, the image processing apparatus 10a is used to perform teaching for selecting the picking position of the workpiece 50 from the range image. The teaching is performed in such a manner that a user directly teaches the picking position of the workpiece 50 with respect to the range image. Specifically, the image processing apparatus 10a makes an image display part display the range image in, for example, a gray scale gradation, an RGB gradation or the like, so that difference in height among respective pixels included in the range image can be grasped.

When the user who refers to the range image selects a suitable position as, for example, a candidate picking position such as by operation of a mouse, to designate the position as a picking position of the workpiece 50, the image processing apparatus 10a draws the picking position taught by the user (hereinafter referred to as "teaching position") on the displayed range image. The image processing apparatus 10a acquires and stores the range image data of the periphery of the picking position (hereinafter referred to as "teaching position peripheral image data") taught by the user. It is noted that the suitable position as a candidate picking position herein is, for example, a position where the height of its three-dimensional point is high.

In the case of selecting the picking position of the workpiece 50 thereafter, the image processing apparatus 10a searches the range image for the image region matched to the stored teaching position peripheral image data. Then, the image processing apparatus 10a uses the matched image region as new teaching position peripheral image data, to select, for example, the central position of the image data as a new picking position. As described above, the image processing apparatus 10a is able to select a new picking position on the basis of the teaching position peripheral image data stored according to the teaching by the user. Thus, even without reception of a new teaching from the user, the image processing apparatus 10a is able to select the picking position of the workpiece 50. The robot system 1a with such a configuration is capable of selecting the picking position of the workpiece 50 in a simpler method than conventional methods. The robot controller 20 generates a control signal for performing picking-up at the picking position of the workpiece 50 selected by the image processing apparatus 10a. Then, the robot 30 picks up the workpiece 50 on the basis of the control signal generated by the robot controller 20. The robot system 1a with such a configuration is capable of actually picking up the workpiece 50 on the basis of the selected picking position.

The image processing apparatus 10a further performs machine learning on the basis of the teaching result, and builds a learning model for selecting the picking position of the workpiece 50. Then, the image processing apparatus 10a selects a new picking position from the range image on the basis of the built learning model. The robot system 1a with such a configuration is capable of selecting the picking position with higher accuracy. The outline of the robot system 1a has been described so far. The following descriptions are about respective devices included in the robot system 1a.

The image processing apparatus 10a is an apparatus for performing teaching and machine learning using a range image. Detailed description of the image processing apparatus 10a will be given later with reference to the functional block diagram of FIG. 2.

The robot controller 20 is an apparatus for controlling the operation of the robot 30. The robot controller 20 generates a control signal for controlling the operation of the robot 30, on the basis of information such as of the picking position of the workpiece 50 selected by the image processing apparatus 10a. Then, the robot controller 20 outputs the generated control signal to the robot 30.

It is noted that in the image processing apparatus 10a and the robot controller 20, a machine coordinate system for controlling the robot 30 is associated with the camera coordinate system indicating the picking position of the workpiece 50 through the calibration previously performed.

The robot 30 is a robot operating under the control by the robot controller 20. The robot 30 includes a base portion rotating around a vertical axis, an arm moving and rotating, and a hand attached to the arm so as to grip the workpieces 50. The robot 30, according to the control signal output by the robot controller 20, drives the arm and the hand to move the hand to the teaching position, grips at least one of the workpieces 50 in bulk, and picks it out from the container 60. It is noted that the illustration of the destination where the picked-up workpiece 50 is transferred will be omitted.

Since the specific configurations of the robot 30 and the hand are well known to those skilled in the art, the detailed description thereof will be omitted.

The three-dimensional measuring device 40 generates the range image by measuring the workpieces 50 in the container 60. The three-dimensional measuring device 40 may be realized by, for example, a camera including a range image sensor as described above, or a three-dimensional measuring device using a stereo camera. The three-dimensional measuring device 40 is not limited to a camera including a range image sensor or a three-dimensional measuring device using a stereo camera, and may be realized by a three-dimensional measuring device in another system, as long as it is capable of generating a range image of a three-dimensional point group in the process of measurement. The range image generated by the three-dimensional measuring device 40 is output to the image processing apparatus 10*a*.

The workpieces 50 are placed in a disordered state including a bulk state, in the container 60. Each of the workpieces 50 may have any shape, and the shape or the like thereof is not limited specifically, as long as the workpieces 50 are enabled to be gripped by the hand attached to the arm of the robot 30.

<Functional Blocks of Image Processing Apparatus 10*a*>

Figure 2:
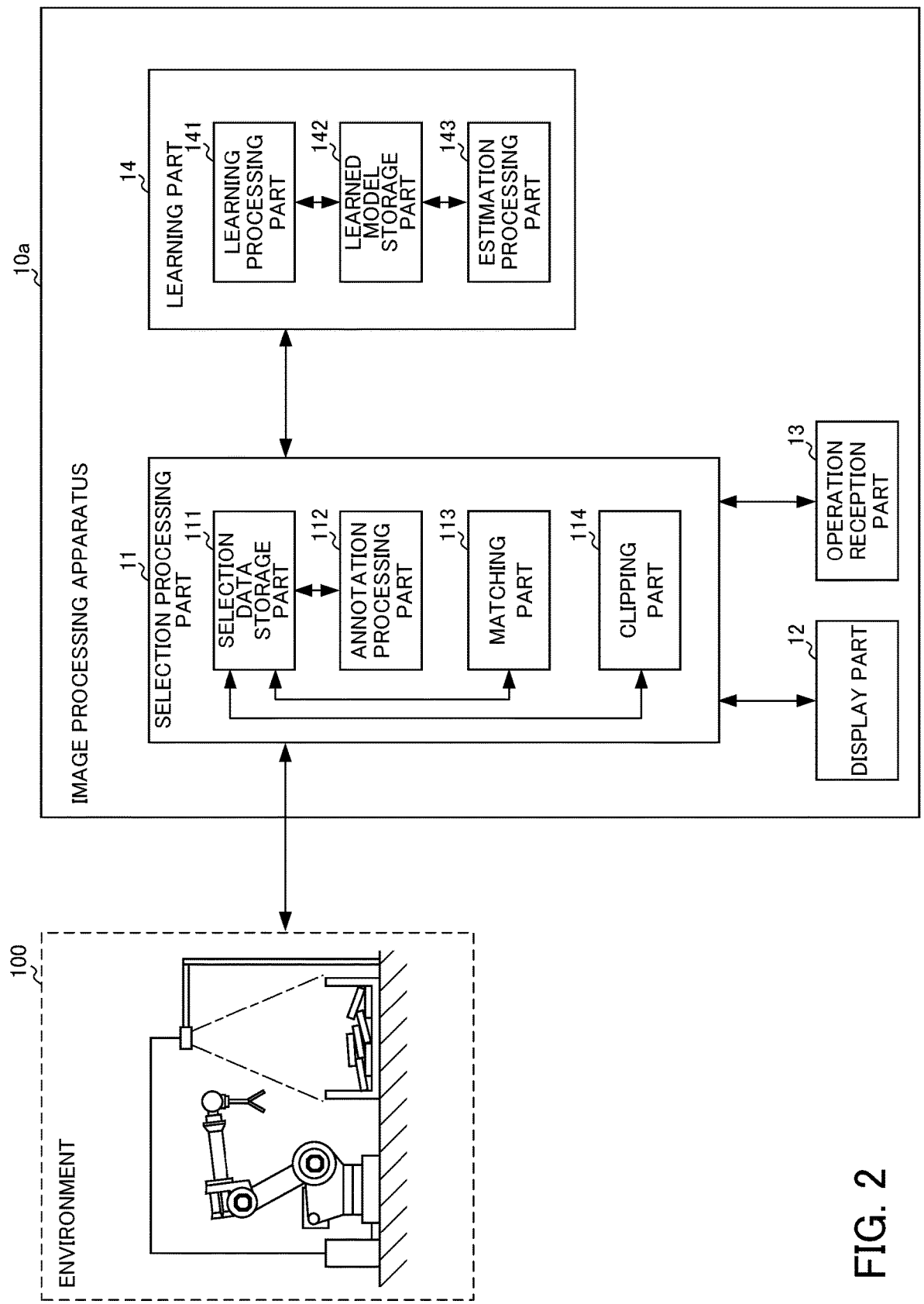
FIG. 2 is a block diagram illustrating functional blocks of an image processing apparatus in a first embodiment of the present invention.

The following description with reference to FIG. 2 is about the respective functional blocks included in the image processing apparatus 10*a*. It is noted that in FIG. 2, constituent elements other than the image processing apparatus 10*a* in the robot system 1*a* are collectively illustrated as an environment 100.

The image processing apparatus 10*a* includes a selection processing part 11, a display part 12, an operation reception part 13, and a learning part 14.

As described above as the outline of the robot system 1*a*, the selection processing part 11 selects the picking position of the workpiece 50 by performing various types of image processing. The image processing performed by the selection processing part 11 is roughly classified into two types, "matching processing" and "clipping processing." In order to perform these types of processing, the selection processing part 11 includes a selection data storage part 111, an annotation processing part 112, a matching part 113, and a clipping part 114. The selection data storage part 111 is a unit for storing various types of data to be used by the respective functional blocks in the selection processing part 11. The annotation processing part 112 is a unit for performing processing for receiving a teaching of the picking position of the workpiece 50 from the user. The matching part 113 is a unit for performing matching processing. The clipping part 114 is a unit for performing clipping processing. The descriptions will be given later of the functions of the respective functional blocks included in the selection processing part 11 and the contents of the matching processing and the clipping processing.

The display part 12 is a unit for displaying the images output by the selection processing part 11. The images output by the selection processing part 11 are, for example, the range image which is generated by measuring the workpieces 50 by the three-dimensional measuring device 40, and the image in which the teaching position taught by the user is drawn on the range image. The display part 12 is realized by, for example, a liquid crystal display or an organic EL display.

The operation reception part 13 is a unit for receiving operation from the user. The operation reception part 13 receives, for example, operation for designating the picking position for teaching the picking position of the workpiece 50, from the user who refers to the range image displayed on the display part 12. The operation reception part 13 is realized by, for example, a mouse, a keyboard, or the like.

In an example, the user may use a mouse or a keyboard to move the cursor displayed on the display part 12 to the picking position (to the position indicating the picking position on the image), thereby designating the picking position. Alternatively, the display part 12 and the operation reception part 13 may be integrally realized by a touch panel, whereby the user taps the picking position (the position indicating the picking position on the image) to designate the picking position, as an example.

The learning part 14 is a unit for performing processing relating to machine learning. The learning part 14 includes a learning processing part 141, a learned model storage part 142, and an estimation processing part 143. The learning processing part 141, which is a unit for performing machine learning, performs deep learning using, for example, a convolution neural network. The learned model storage part 142 is a unit for storing parameters of a learning model in progress of learning by the learning processing part 141 and parameters of learned models in machine learning. The estimation processing part 143 performs estimation using the learned models stored in the learned model storage part 142, for the sake of the selection of the picking position by the selection processing part 11. The machine learning to be performed by these respective units will be described in detail later in the item of <Machine learning>.

The functional blocks included in the image processing apparatus 10*a* have been described so far. In order to realize these functional blocks, the image processing apparatus 10*a* includes an arithmetic processing unit such as a CPU (Central Processing Unit). The image processing apparatus 10*a* further includes an auxiliary storage device such as a HDD (Hard Disk Drive) for storing various control programs such as application software and OS (Operating System), and a main storage device such as a RAM (Random Access Memory) for temporarily storing data required when the arithmetic processing unit executes such a program.

In the image processing apparatus 10*a*, the arithmetic processing unit reads such application software and OS from the auxiliary storage device, and executes arithmetic processing based on the application software and the OS while developing the read application software and OS in the main storage device. Various types of hardware included in respective units are controlled on the basis of the result of the arithmetic processing. In such a manner, the functional blocks in the first embodiment are realized. In other words, the first embodiment can be realized by collaboration of hardware and software.

In a specific example, the image processing apparatus 10*a* can be realized by integrating application software for realizing the first embodiment in a general personal computer or a server. The image processing apparatus 10*a* involves a large amount of computation associated with the machine learning performed by the learning part 14. Therefore, in an example, GPU (Graphics Processing Units) mounted on a computer and a technique called GPGPU (General-Purpose computing on Graphics Processing Units) are preferably used for arithmetic processing associated with the machine learning, thereby enabling to perform high speed processing. Alternatively, FPGA (Field-Programmable Gate Array) mounted on a computer is preferably used for arithmetic processing associated with the machine learning, thereby enabling to perform high speed processing.

Furthermore, in order to perform higher speed processing, a computer cluster may be built by use of a plurality of computers equipped with such GPU or FPGA, so that the plurality of computers included in the computer cluster performs parallel processing.

<Matching Processing>

The processing performed by the selection processing part 11 is described in detail below. As described above, the selection processing part 11 performs two types of processing, "matching processing" and "clipping processing." Firstly, the matching processing is described with reference to FIG. 3 to FIG. 6.

Figure 3:
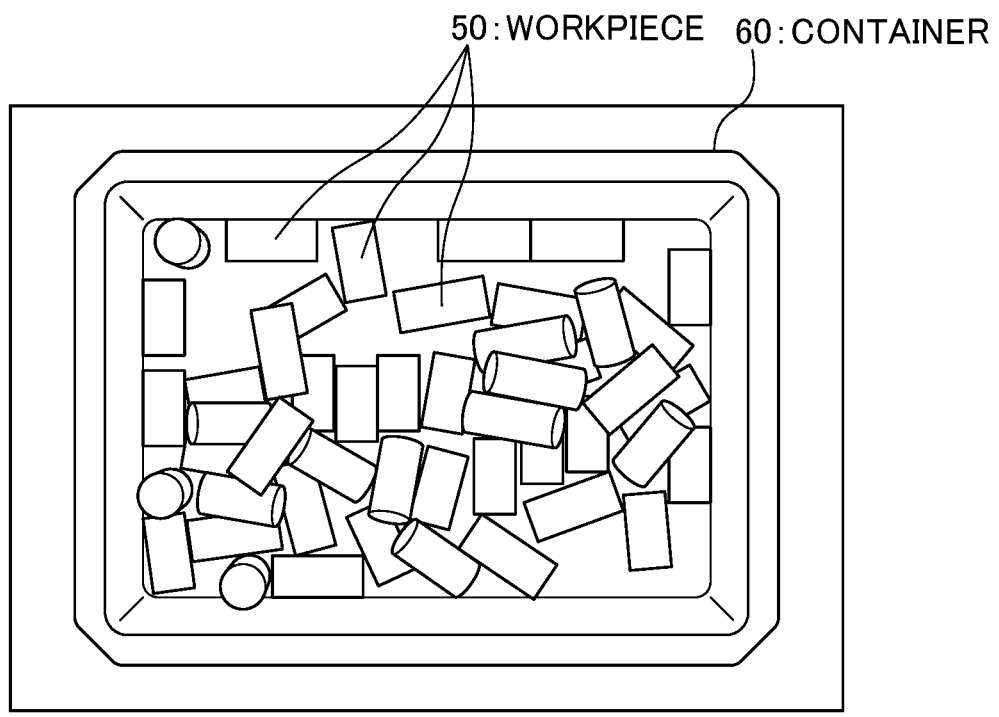
FIG. 3 is a schematic diagram illustrating workpieces in bulk to be picked up in each embodiment of the present invention.

FIG. 3 shows the state in which the workpieces 50 stacked in the container 60 are overlooked. As shown in FIG. 3, the workpieces 50 are placed disorderly in bulk. Thus, it is difficult to grip and pick up the workpiece 50 by the hand of the robot 30 without reception of the teaching of the picking position of the workpiece 50. Ii is noted that in the diagrams, for convenience of illustration, only some of the workpieces 50 are denoted by the reference numeral.

Figure 4:
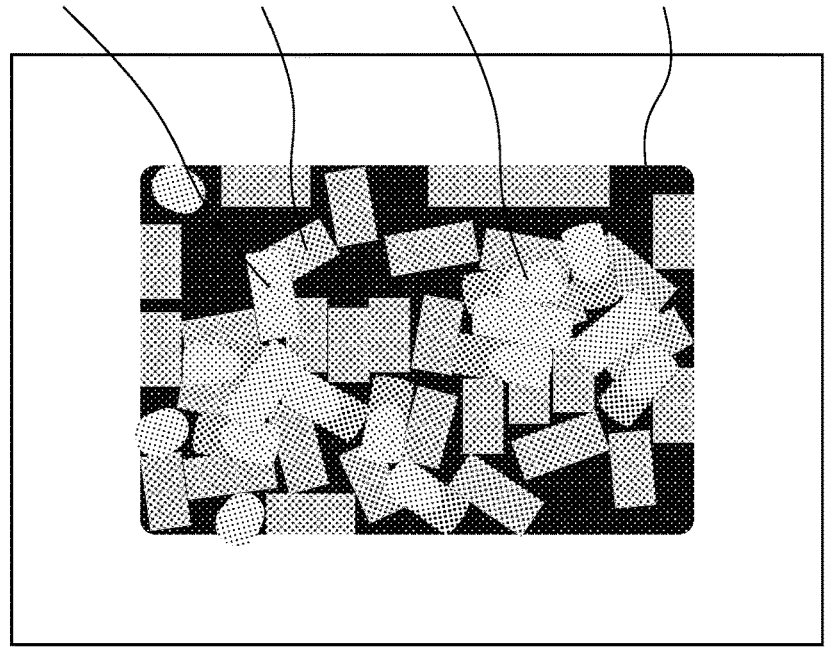
FIG. 4 is a diagram illustrating a range image generated by measuring the workpieces in bulk in each embodiment of the present invention.

The three-dimensional measuring device 40 generates the range image by measuring the workpieces 50 stacked in bulk in the container 60. The three-dimensional measuring device 40 transmits the generated range image to the selection processing part 11 of the image processing apparatus 10a. The range image received by the selection processing part 11 is stored in the selection data storage part 111. The annotation processing part 112 acquires the range image from the selection data storage part 111, in order to receive the teaching of the picking position of the workpiece 50 from the user. Then, the annotation processing part 112 outputs the acquired range image to the display part 12. The display part 12 displays the input range image as shown in FIG. 4. It is noted that in the diagram, for convenience of illustration, only some of the workpieces 50 are denoted by the reference numeral.

The three-dimensional measuring is performed, thereby enabling to generate the range image in which the positions of respective two-dimensional pixels have height information. The annotation processing part 112 makes the range image to be displayed so as to express the height information of respective pixels with RGB color gradation, or express it with density of gray scale. The user giving a teaching is able to recognize depth information by referring to the range image expressed by such an expression method.

According to restrictions on illustration in the patent diagrams, height information of respective pixels is expressed by hatching in FIG. 4. The expression is not limited to this. In an example, the height information of respective pixels may be expressed by color gradation, gradation or the like. In FIG. 4, an object located at a shorter distance away from the three-dimensional measuring device 40 (that is, the height of an object from the ground is higher) is expressed whiter, while an object located at a longer distance away from the three-dimensional measuring device 40 (that is, the height of an object from the ground is lower) is expressed darker black.

In an example, a workpiece 50a is located at a higher position than a workpiece 50b from the ground, and thus the workpiece 50a is hatched so as to be expressed whiter than the workpiece 50b. The area corresponding to the workpiece 50b is partially hidden by the area corresponding to the workpiece 50a. The user referring to this is able to recognize that the workpiece 50a is stacked above the workpiece 50b. In an example, the area corresponding to a workpiece 50c varies in height depending on the position. The user referring to this is able to recognize that the workpieces 50c is stacked in an inclined state.

Figure 5:
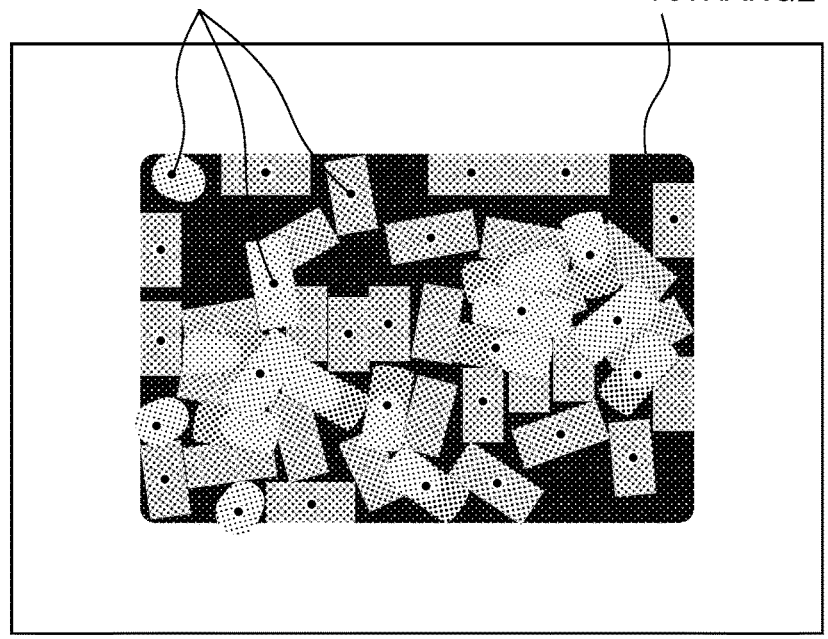
FIG. 5 is a diagram illustrating the range image in which taught picking positions are drawn in each embodiment of the present invention.

The user referring to the range image displayed on the display part 12 as described above designates the picking position of the workpiece 50 by using the operation reception part 13 realized by a mouse or a touch panel as described above, thereby teaching the picking position of the workpiece 50. The operation reception part 13 notifies the annotation processing part 112 of the teaching position which is the taught picking position of the workpiece 50. The annotation processing part 112 draws the notified teaching position with respect to the teaching position on the range image so that the user is able to recognize the teaching position. Such drawing is performed by a method, for example, a method of differently coloring the pixels of the teaching position on the range image, so that the user easily recognizes the position. FIG. 5 shows a display example in which such drawing is performed.

The user teaches the picking position for each of the workpieces 50 located at positions capable of picking-up. Then, as shown as teaching positions 71 in the diagram, the teaching positions are drawn so that the teaching positions taught by the user are able to be grasped. It is noted that in the diagram, for convenience of illustration, only some of the teaching positions 71 are denoted by the reference numeral.

The annotation processing part 112 acquires the three-dimensional point information of the teaching position, and the teaching position peripheral image data which is the three-dimensional point group information of a predetermined peripheral range of the teaching position centered on the teaching position. Then, the annotation processing part 112 associates the acquired three-dimensional point information of the teaching position with the acquired teaching position peripheral image data, and stores them in the selection data storage part 111 as point group information for matching.

Figure 6:
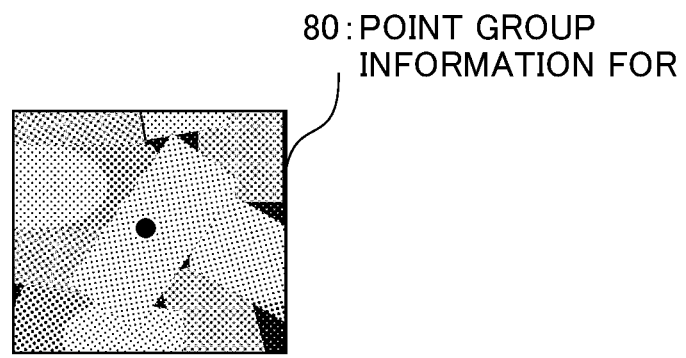
FIG. 6 is a diagram illustrating three-dimensional point group information of the periphery of the drawn position to be recorded in the first embodiment of the present invention.

FIG. 6 shows one example of the point group information for matching as point group information for matching 80. Although a teaching point is drawn merely for explanation in the example of FIG. 6, the teaching position peripheral image data included in the point group information for matching 80 includes no teaching position drawn. In the following description, the indication of "80" which is the reference numeral given to the point group information for matching will be omitted.

The range size of the three-dimensional point group to be acquired as point group information for matching is previously set on the basis of the size of the workpieces 50 or the like. It is noted that the point group information for matching may be used in such a manner that the three-dimensional point group information having a somewhat large range is stored as point group information for matching, and thereafter the setting thereof is adjusted so that the point group information for matching is trimmed and acquired in a desired size when the stored point group information for matching is used in the matching described below.

It is noted that the annotation processing part 112 may add additional information to the point group information for matching. For example, information indicating the features of the point group information for matching may be added. The information indicating features herein is, for example, information such as of an average of heights of the three-dimensional points of the plurality of pixels included in the point group information for matching, or the height of the three-dimensional points of the pixels corresponding to the teaching position.

In the first embodiment, since the plurality of workpieces 50 are stacked in bulk, the plurality of teaching positions are taught by the user as described above by use of one piece of range image obtained by measurement by the three-dimensional measuring device 40, thereby enabling to teach the picking positions with respect to the possible respective postures of the workpieces 50.

In the teaching with a CAD model described as a related art, it is assumed that three-dimensional points can be uniformly acquired with respect to shapes. However, when images are actually photographed, three-dimensional points cannot be uniformly acquired with respect to shapes due to optical conditions and the like. As described above, there is a difference in ease of acquisition of the three-dimensional points between assumption and actual imaging, and thus such difference may affect the degree of matching, in some cases.

On the other hand, in the first embodiment, the range image based on the three-dimensional points acquired under the actual optical conditions is acquired as input, and thus the three-dimensional point group information of the periphery of the drawing position can be stored, thereby enabling to prevent such a trouble that, as in the case of the teaching with a CAD model, the teaching position of the workpiece 50 corresponding to the teaching position on the CAD model cannot be acquired due to the optical conditions and the like.

The following description is about the matching using the point group information for matching performed by the matching part 113 in order that the workpiece 50 is picked up. In order that the workpiece 50 is picked up, the matching part 113 acquires the range image of the workpieces 50 in bulk stacked in the container 60, from the three-dimensional measuring device 40. Then, the matching part 113 searches the acquired range image on the basis of the teaching position peripheral image data included in each piece of point group information for matching stored in the selection data storage part 111, by using a matching method of three-dimensional point groups, for example, ICP (Iterative Closest Point) matching. Then, the matching part 113 selects, for example, the central position of the image region having a high evaluation of matching in the range image, as the picking position of the workpiece 50 to be picked up. It is noted that the matching part 113 may select the plurality of image regions whose evaluations of matching are higher than a threshold value, and may use the image region having the highest height from the ground among the plurality of image regions, as new teaching position peripheral image data.

The matching part 113 transmits the selected picking position of the workpiece 50 to the robot controller 20. Then, the robot controller 20 controls the robot 30 on the basis of the received picking position of the workpiece 50 so that picking up of the workpiece 50 is tried to be performed.

Herein, although the point group information for matching is generated on the basis of the teaching by the user as described above, all the pieces of point group information for matching are not necessarily appropriate. In an example, in some cases, the picking-up may succeed in the case where a region having a high evaluation of matching with a certain piece of point group information for matching is set as a picking position, but may fail in the case where a region having a high evaluation of matching with another piece of point group information for matching is set as a picking position. As described above, in some cases, the success or failure may depend on a piece of the point group information for matching. Thus, the matching part 113 may evaluate each piece of point group information for matching, thereby imparting an evaluation value to each piece of point group information for matching. Then, the matching part 113 preferably uses the point group information for matching having a high evaluation value. The matching part 113 stores the point group information for matching having the imparted evaluation values in the selection data storage part 111, in order that the point group information for matching having the imparted evaluation values is used as teacher data in the machine learning described later. It is noted that the point group information for matching having low evaluation values is also necessary as teacher data (failure data) for the machine learning. Therefore, the matching part 113 stores not only the point group information for matching having high evaluation values but also the point group information for matching having low evaluation values, as teacher data in the selection data storage part 111.

The matching part 113 is capable of imparting an evaluation value depending on the success or failure in picking up the workpiece 50. In an example, in the case where a region having a high evaluation of matching with a certain piece of point group information for matching is set as a picking position, and further where the picking-up of the workpiece 50 succeeds, the matching part 113 imparts a higher evaluation value than the case where the picking-up fails. In an example, the matching part 113 imparts a first predetermined value or higher (for example, 60 points or higher) in the case where the picking-up of the workpiece 50 succeeds, and imparts a second predetermined value or lower (for example, 50 points or lower) in the case where the picking-up of the workpiece 50 fails. In an example, in the case where the picking-up of the workpiece 50 succeeds, the matching part 113 may impart an evaluation value further differently depending on the time taken for the picking-up. In an example, as the time taken for picking up the workpiece 50 is shorter, the matching part 113 may impart a higher evaluation value. In another example, in the case where the picking-up of the workpiece 50 fails, the matching part 113 may impart an evaluation value differently depending on the degree of failure. In an example, in the case where the workpiece 50 has been gripped but has fallen in the middle of the picking-up, the matching part 113 may impart a higher evaluation value than the case where the workpiece 50 has not been gripped.

The matching part 113 performs matching based on each piece of point group information for matching, with respect to the range image acquired by measurement this time. The matching part 113 tries to pick up the workpiece 50 at each matched position, and imparts an evaluation value as described above. The processing is repeated by newly acquiring the range image of the workpieces 50 in bulk stacked in the container 60, from the three-dimensional measuring device 40.

In such a manner, the matching part 113 repeats the matching and the picking-up of the workpiece 50 by using the point group information for matching, and also the imparting of an evaluation value depending on the result of the picking-up, thereby enabling to evaluate each piece of point group information for matching. Then, the matching part 113 selects a piece of point group information for matching having a high evaluation value, thereby enabling to improve the probability of successfully picking up the workpiece 50.

The matching part 113 may acquire the three-dimensional point group information having the same size range as the point group information for matching with respect to the region where the matching succeeds in the range image, and may use the acquired three-dimensional point group information as new point group information for matching. With such a method, the matching part 113 is able to pick up the workpiece 50 with respect to the new point group information for matching acquired on the basis of the matched region, in addition to the point group information for matching used in the matching. In other words, the matching part 113 is able to automatically increase the point group information for matching. This enables to collect the point group information for matching having higher evaluation values.

As described above, in the first embodiment, the matching part 113 repeats the matching and the picking-up of the workpiece 50 by using the point group information for matching, and also the imparting of an evaluation value depending on the result of the picking-up, thereby enabling to select the picking position of the workpiece 50. The matching part 113 is able to automatically increase the point group information for matching. Accordingly, in the first embodiment, the workpiece 50 is enabled to be picked up on the basis of the selected picking position without reception of a new teaching from the user.

It is noted that the first embodiment is based on the teaching with respect to the range image acquired by actually measuring the workpieces 50 by the three-dimensional measuring device 40, unlike a conventionally-performed teaching with respect to a CAD model and the like. In such a case where the range image acquired by actually measuring the workpieces 50 is used as described above, the matching likely fails to be established due to disturbance or the like. Therefore, in some cases, a threshold value relating to the success or failure in the matching may be set lower so that the matching is likely established. However, taking such a method of setting a lower threshold value causes the problem that the matching is established even at the positions which are actually not suitable to be detected as picking positions. In order to alleviate this problem, when the matching is tried at a position not taught by drawing, and if the matching is established at such a position not taught, the position may be deemed to be unsuitable as the detection position, and the processing of excluding the position from the final detected positions may be further added to the processing in the first embodiment described above. The matching processing by the matching part 113 has been described so far. The above-described matching processing enables to realize the selection of the picking position of the workpiece 50. The machine learning by the learning part 14 and the clipping processing by the clipping part 114 are combined with this configuration, thereby enabling to improve accuracy in selecting the picking position of the workpiece 50. The machine learning by the learning part 14 is described below. Thereafter, the clipping processing by the clipping part 114 is described.

<Machine Learning>

As described above, the matching part 113 repeats the matching and the picking-up of the workpiece 50 by using the point group information for matching, and also the imparting of an evaluation value depending on the result of the picking-up, thereby generating the point group information for matching having imparted evaluation values. Then, as described above, the matching part 113 stores in the selection data storage part 111 the point group information for matching having the imparted evaluation values. The learning processing part 141 of the learning part 14 performs supervised machine learning, by using as teacher data the point group information for matching having the imparted evaluation values, which is stored in the selection data storage part 111. The learning processing part 141 builds a learning model for improving accuracy in selecting the picking position of the workpiece 50, through the supervised learning. Then, the learning processing part 141 stores the built learning model in the learned model storage part 142. Then, in the clipping processing described later, the estimation processing part 143 uses the learning model stored in the learned model storage part 142, thereby enabling to select the picking position of the workpiece 50 without performing of the matching with the range image acquired by measurement by the three-dimensional measuring device 40. The learning processing part 141 further performs the machine learning on the basis of the success or fail in the picking-up in the clipping processing, thereby enabling to further update the learning model which has been built once and stored in the learned model storage part 142.

Building of the learning model is described below specifically. The learning processing part 141 performs the supervised learning, by using as input data the teaching position peripheral image data included in the point group information for matching stored in the selection data storage part 111, and using as a label the evaluation value imparted to the point group information for matching. As a method for the supervised learning, the learning processing part 141 performs deep learning using Convolutional Neural Network (CNN), which is a neural network suitable for learning with respect to image data. The convolution neural network is prepared for the learning, so as to have three or more layers and include at least once of image convolution operation. However, the machine learning applied in the first embodiment is not intended to be limited to such a convolution neural network. Machine learning using a deep learning model other than such a convolution neural network, a linear model, or the like may be applied in the first embodiment.

The convolution neural network herein has a structure including a convolution layer, a pooling layer, a fully connected layer, and an output layer. This is a structural example merely for explanation. For example, a pooling layer may be omitted. In the case where the learning is performed by use of an image as a label as described above, a deconvolution layer may be further provided.

In the convolution layer, the input three-dimensional point group information is filtered with a predetermined parameter in order that feature extraction such as edge extraction is performed. A predetermined parameter in the filtering, which corresponds to weight of a general neural network, is learned through repeating of the learning.

In an example, in the pooling layer, the image output from the convolution layer is divided into small windows, and the features of respective windows (for example, the maximum values in respective windows) are output. The convolution layer and the pooling layer are combined, thereby enabling to extract a feature quantity from the three-dimensional point group information.

In the fully connected layer, a feature extracted through the convolution layer and the pooling layer is connected to one node, and the value converted by an activation function is output. The activation function herein is a function in which all the output values less than 0 are changed to 0, and is used to send only a portion having a certain threshold value or higher as meaningful information to the output layer.

The output layer outputs an evaluation value with respect to the picking-up based on the point group information for matching used as input data, on the basis of the output from the fully connected layer. Then, the error between the output from the output layer and the label is calculated. The label herein is the evaluation value imparted to the point group information for matching used as input data, as described above.

At the start of the learning, since each parameter included in the convolution neural network is not appropriately weighted, the error may likely have a large value. Therefore, the learning processing part 141 corrects the weighting value so as to reduce the calculated error. Specifically, the processing called forward propagation or back propagation is repeated in order to reduce the error, thereby changing a weighting value of each perceptron included in the convolution neural network.

In such a way, the learning processing part 141 learns the features of the teacher data, and inductively acquires the learning model for outputting the evaluation value from the point group information for matching used as input data. The learning processing part 141 stores the built learning model as a learned model in the learned model storage part 142.

The above-described learning may be performed in the form of online learning, or may be performed in the form of supervised learning in batch learning or mini-batch learning. The online learning herein is a learning method in which supervised learning is performed instantly every time the teacher data is generated. The batch learning herein is a learning method in which while teacher data is generated repeatedly, a plurality of pieces of teacher data are collected upon the repetition, whereby supervised learning is performed by use of all the collected teacher data. The mini-batch learning herein is a learning method corresponding to the intermediate learning method between the online learning and the batch learning, in which supervised learning is performed every time teacher data is accumulated to some extent. In the case of the batch learning or the mini-batch learning, the collected teacher data may be stored in the selection data storage part 111 until the learning is started. In the case where a new piece of teacher data is acquired, the learning may be performed using the parameter of the learned model as an initial value, thereby improving accuracy in estimation by use of the learned model. Alternatively, in the case where a new piece of teacher data is acquired, a separate learning model may be newly built regardless of the learned model.

<Clipping Processing>

The clipping processing performed by the clipping part 114 is described below. The clipping part 114 uses the learning model built by the learning processing part 141, to select the picking position of the workpiece 50 without performing of the matching with the range image acquired by measurement by the three-dimensional measuring device 40. Hereinafter, the processing of selecting the picking position without performing of the matching is referred to as "clipping processing," and the explanation thereof is given below.

In the case of the clipping processing, when a new range image is acquired during the picking work, the clipping part 114 clips out the range image in the same size as input in the learned model (that is, the same size as the point group information for matching) from the acquired entire range image. Then, the clipping part 114 acquires the three-dimensional point group information of the clipped portion (hereinafter, referred to as "candidate picking position").

Figure 7:
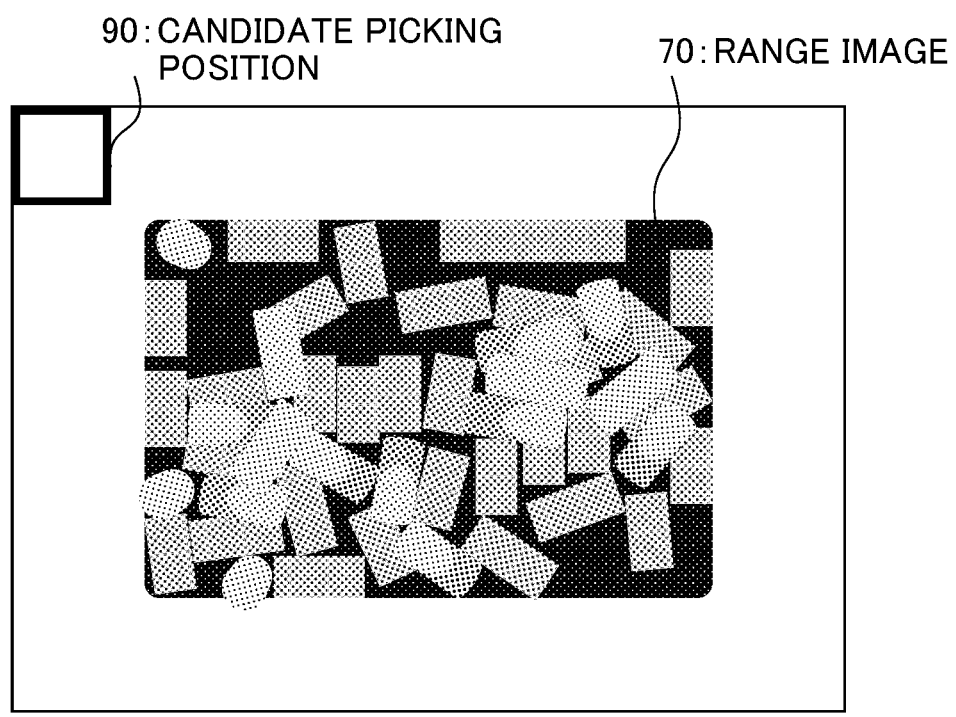
FIG. 7 is a diagram illustrating the clipping performed in the first embodiment of the present invention.

Extraction processing (clipping processing) of a candidate picking position by the clipping part 114 is described with reference to FIG. 7 and FIG. 8. FIG. 7 shows a region to be clipped as a candidate picking position 90. As described above, the candidate picking position 90 has the same size as input in the learned model (that is, the same size as the point group information for matching).

Figure 8:
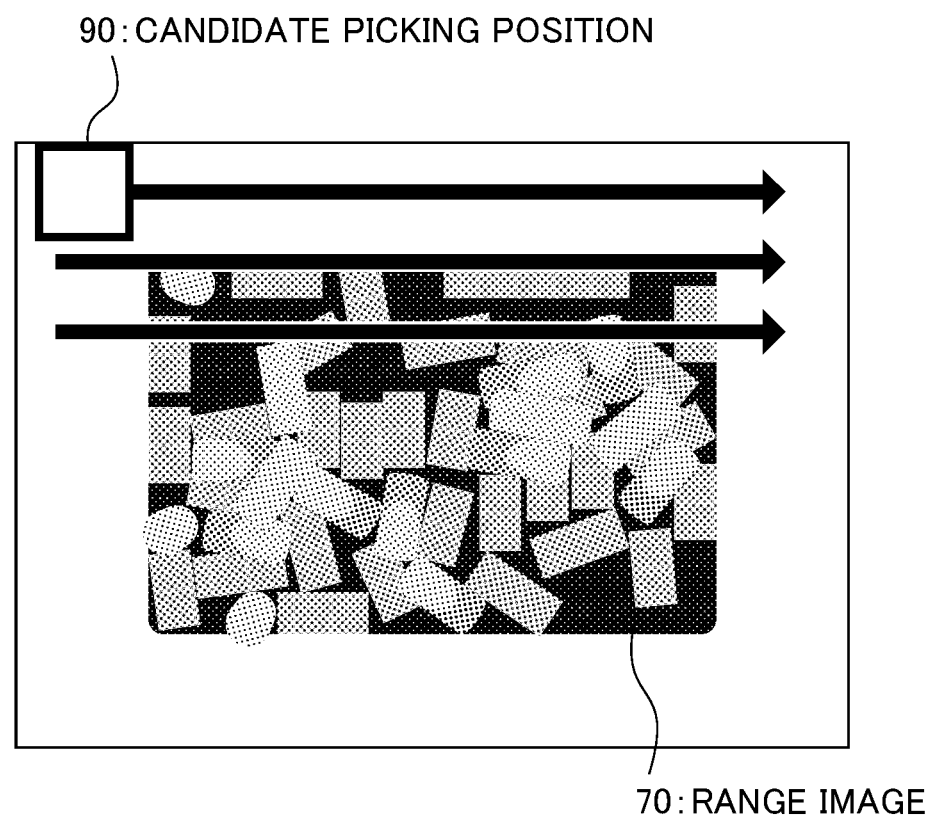
FIG. 8 is a diagram illustrating the scanning performed at clipping in the first embodiment of the present invention.

As shown in FIG. 8 as an example, the clipping part 114 scans the entire image by shifting a target region for the candidate picking position 90 each time by several pixels from the upper left of the image, so as to perform clipping with respect to the entire image. It is noted that although the scanning is performed linearly in FIG. 8, the scanning may be performed rotationally. Alternatively, the start position of the scanning or the scanning direction may be set arbitrarily. The clipping part 114 further acquires the position (for example, the central position of the clipped image data) of the candidate picking position 90 on the range image at the time of clipping, and stores it in the selection data storage part 111 in association with the candidate picking position. The estimation processing part 143 acquires from the selection data storage part 111 respective pieces of three-dimensional point group information with respect to all the candidate picking positions extracted in such a manner. Then, the estimation processing part 143 inputs the respective pieces of three-dimensional point group information of all of the acquired candidate picking positions in the learned model, instead of the above-described point group information for matching, and acquires as outputs the evaluation values with respect to the respective candidate picking positions. The estimation processing part 143 notifies the clipping part 114 of the outputs.

The clipping part 114 selects as a picking position the position stored in association with the clipped image having a high evaluation value output by the learned model. The clipping part 114 transmits the selected picking position to the robot controller 20. Then, the robot controller 20 controls the robot 30 on the basis of the received picking position sot that picking up of the workpiece 50 is tried to be performed.

Even in the case of trying to pick up the workpiece 50 on the basis of the three-dimensional point group information with respect to the candidate picking position, the robot controller 20 may succeed or may fail in picking-up as in the case of trying to pick up the workpiece 50 on the basis of the point group information for matching. Therefore, the clipping part 114 imparts an evaluation value also to the candidate picking position depending on success or failure in picking up the workpiece 50 as in the case of the point group information for matching at the time of the matching processing. The clipping part 114 stores the candidate picking position having the imparted evaluation value in the selection data storage part 111. The learning processing part 141 is able to use the candidate picking position having the imparted evaluation value as new teacher data to update the learned model.

Specifically, the learning processing part 141 preferably performs the online learning or the mini-batch learning described above, by using the three-dimensional point group data of the candidate picking position as input data, and using as a label the evaluation value imparted to the candidate picking position used as input data. This enables to update the learned model to a more accurate learned model in real time while executing the picking operation of the workpieces 50. It is noted that the learning is not limited to the online learning or the mini-batch learning. The learning model may be updated through the batch learning.

<Operation in First Embodiment>

Figure 9A:
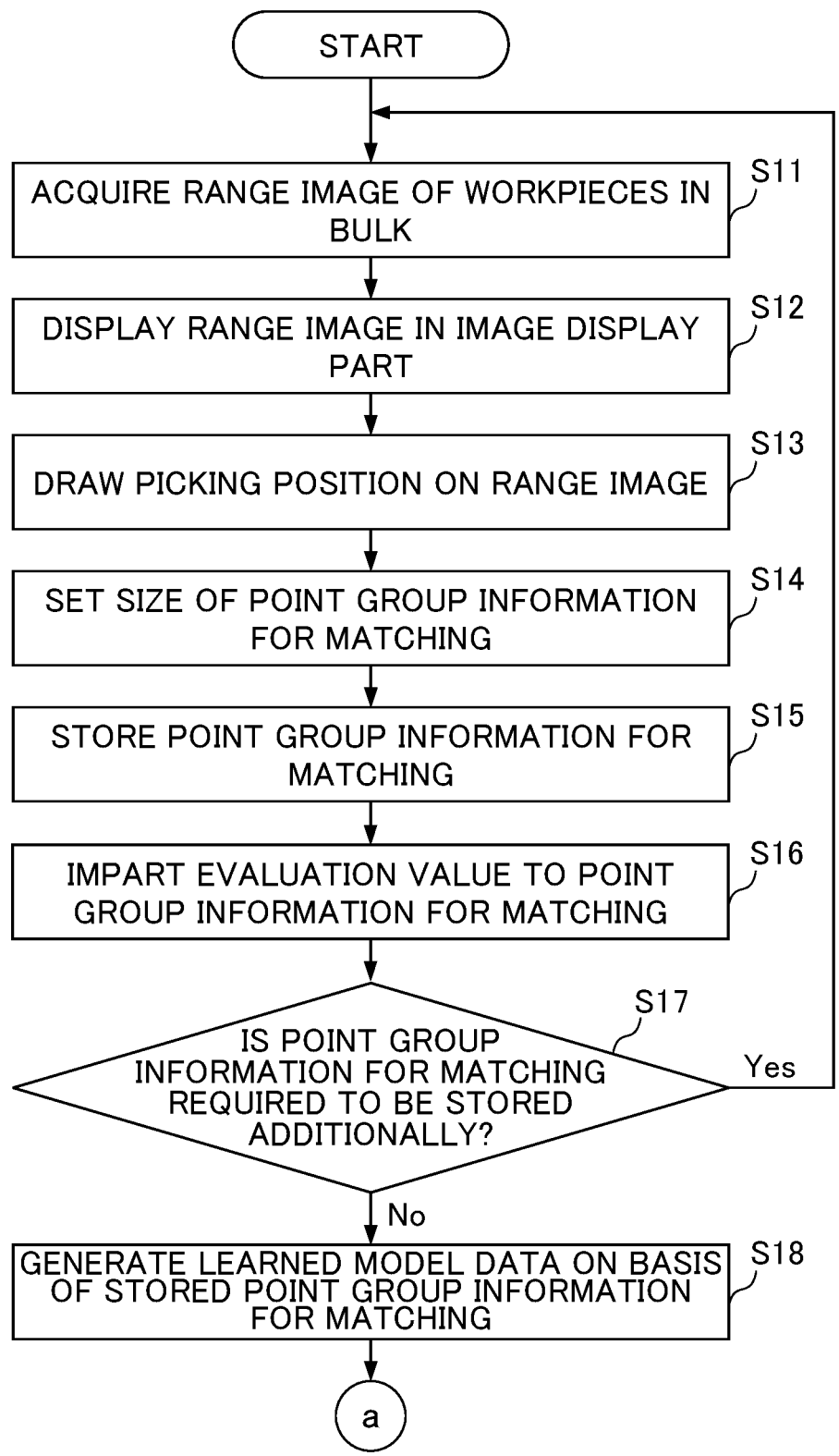
FIG. 9A is a flowchart indicating the operation in the first embodiment of the present invention.
Figure 9B:
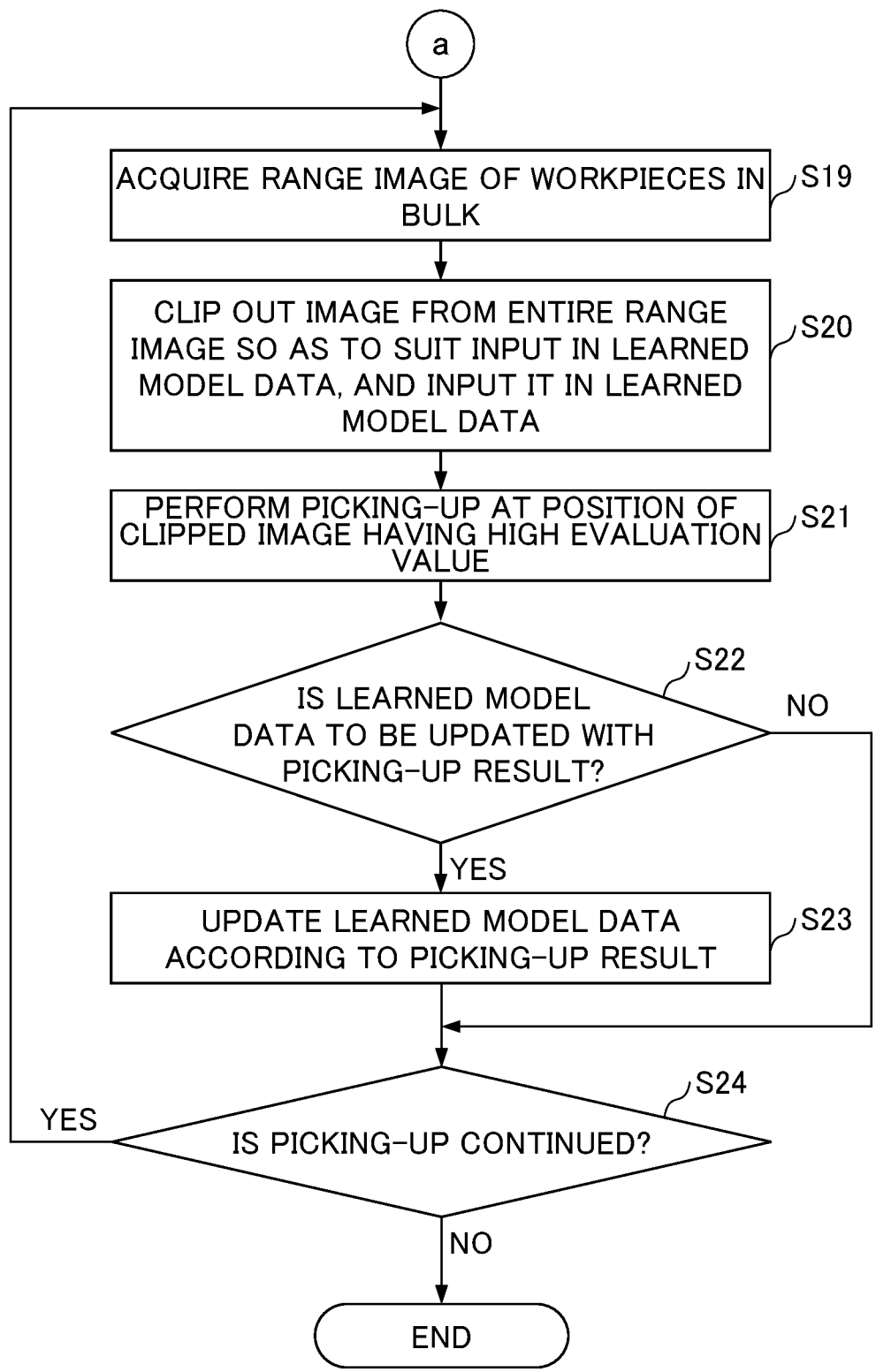
FIG. 9B is another flowchart indicating the operation in the first embodiment of the present invention.

The operation in the first embodiment is described below with reference to the flowcharts of FIG. 9A and FIG. 9B. It is noted that FIG. 9A is the flowchart of the operation corresponding to the matching processing described above, while FIG. 9B is the flowchart of the operation corresponding to the clipping processing described above.

In step S11, the annotation processing part 112 acquires the range image generated by measuring the workpieces 50 in bulk, from the three-dimensional measuring device 40. In step S12, the annotation processing part 112 makes the display part 12 display the range image. In step S13, the annotation processing part 112 draws the teaching position on the range image, on the basis of the teaching of the picking position of the workpiece 50 received from the user by the operation reception part 13.

In step S14, the annotation processing part 112 sets the size of the point group information for matching. The size is set on the basis of a previously-given set value or user's operation. In step S15, the annotation processing part 112 generates the point group information for matching, on the basis of the setting performed in step S14. The annotation processing part 112 stores the generated point group information for matching in the selection data storage part 111. In step S16, the matching part 113 imparts an evaluation value to the point group information for matching, by performing the matching and the picking-up of the workpiece 50 by using the point group information for matching stored in the selection data storage part 111. The matching part 113 stores the point group information for matching having the imparted evaluation value in the selection data storage part 111.

In step S17, the matching part 113 determines whether or not the point group information for matching is required additionally. In the case where a predetermined number or more of pieces of point group information for matching each having a predetermined evaluation value or higher are stored, the determination is made as No in step S17, and the processing proceeds to step S18. While in the case where a predetermined number or more of pieces of point group information for matching each having a predetermined evaluation value or higher are not stored, the determination is made as Yes in step S17, the processing returns to step S11 so that the processing is repeated again.

In step S18, the learning processing part 141 performs learning, by using as input data the point group information for matching stored by the learning part 14, and using as a label the evaluation value imparted to the point group information for matching. This builds a learned model and stores it in the learned model storage part 142.

The operation in the clipping processing is described below with reference to FIG. 9B. In step S19, the clipping part 114 acquires the range image generated by measuring the workpieces 50 in bulk, from the three-dimensional measuring device 40.

In step S20, the clipping part 114 clips out the range image in the same size as input in the learned model (that is, the same size as the point group information for matching) from the acquired entire range image, as a candidate picking position. Then, the clipping part 114 acquires the three-dimensional point group information of the candidate picking position. The clipping part 114 stores the acquired three-dimensional point group information of the candidate picking position in the selection data storage part 111. The estimation processing part 143 inputs in the learned model the respective pieces of three-dimensional point group information of all the candidate picking positions stored in the selection data storage part 111, and acquires as outputs the evaluation values with respect to the respective candidate picking positions. The estimation processing part 143 notifies the clipping part 114 of the outputs.

In step S21, the clipping part 114 selects as a picking position the position stored in association with the clipped image having a high evaluation value output by the learned model. The clipping part 114 transmits the selected picking position to the robot controller 20. Then, the robot controller 20 controls the robot 30 on the basis of the received picking position so that picking up of the workpiece 50 is tried to be performed. As described above, as a result of trying to pick up the workpiece 50, the picking-up may succeed or may fail. Then, the clipping part 114 imparts an evaluation value to the candidate picking position depending on success or failure in picking up the workpiece 50.

In step S22, the learning processing part 141 determines whether to update the learned model, by performing learning by using as teacher data the candidate picking position to which the evaluation value is imparted in step S21. In the case where the mini-batch learning is performed, and further where a predetermined number of pieces of teacher data have been recorded or where a predetermined period of time has elapsed since the previous learning, the determination is made as Yes in step S22, and the processing proceeds to step S23. While in the case where only a predetermined number or less of pieces of teacher data have been recorded or where a predetermined period of time has not elapsed since the previous learning, the determination is made as No in step S22, and the processing proceeds to step S24. It is noted that in the case where the online learning is performed, the determination is made as Yes in step S22, and the processing proceeds to step S23.

In step S23, the learning processing part 141 performs the learning described above, by using the three-dimensional point group data of the candidate picking position as input data, and using as a label the evaluation value imparted to the candidate picking position used as input data. This updates the learned model stored in the learned model storage part 142.

In step S24, the clipping part 114 determines whether to continue the picking-up. In the case where there are some candidate picking positions each having the evaluation value and further where the picking-up is not performed with respect to the candidate picking positions, some workpieces 50 not having been picked up are considered to be left, and thus the determination is made as Yes in step S24, and the processing proceeds to step S19. While in the case where the picking-up has been performed with respect to all the candidate picking positions each having a high evaluation value, all the workpieces 50 are considered to have been picked up, and thus the determination is made as No in step S24, and the processing is terminated.

According to the matching processing in the first embodiment described above, search is performed by use of the matching with the range image acquired by measurement by the three-dimensional measuring device 40 on the basis of the stored point group information for matching (three-dimensional point information of the teaching position, and teaching position peripheral image data centered on the teaching position), without reception of a new teaching from the user after reception of the teaching of the picking position from the user in step S13, thereby enabling to select the picking position. According to the matching processing in the first embodiment, the user merely teaches the picking position, and is not required to have knowledge based on experiences such as of selecting search algorithm. According to the matching processing in the first embodiment, since CAD data is not used, the labor and time for preparing CAD data are saved. In other words, according to the matching processing in the first embodiment, the picking position of the workpiece 50 is able to be selected in a simpler method than conventional methods.

According to the clipping processing in the first embodiment, a learning model is further built on the basis of the point group information for matching, and the picking position is able to be selected from the image data automatically clipped out from the range image, on the basis of the built learning model, thereby enabling to more efficiently select the picking position with higher accuracy. Furthermore, according to the clipping processing in the first embodiment, new teacher data is able to be acquired as the picking-up is continued, thereby enabling to update the built learning model in real time.

Second Embodiment

The second embodiment is described below in detail. It is noted that the basic configuration of the second embodiment is common to that of the first embodiment. For example, the overall configuration of a robot system 1b according to the second embodiment is equivalent to the overall configuration of the robot system 1a according to the first embodiment shown in FIG. 1. In the configuration of the second embodiment, an image processing apparatus 10b which is an image processing apparatus in the second embodiment is substituted for the image processing apparatus 10a. In the following description, in order to avoid overlapped description, the description of such common matters in the both embodiments will be omitted, and differences between the embodiments are described in detail.

<Outline of Differences Between First Embodiment and Second Embodiment>

In the first embodiment, before the learning is performed, the image processing apparatus 10a performs the pre-processing in which the matching is performed with respect to the range image acquired from the three-dimensional measuring device 40, and the point group information for matching is generated. Then, the image processing apparatus 10a builds the learning model through the machine learning, and selects the picking position by use of the built learning model, by using the point group information for matching as input data in the learning model, and using the evaluation value imparted to the point group information for matching as a label.

Alternatively, in the first embodiment, the image processing apparatus 10a performs the pre-processing in which the range image is clipped out in the same size as input in the learned model (that is, the same size as the point group information for matching) from the entire range image acquired from the three-dimensional measuring device 40, as a candidate picking position. Then, the image processing apparatus 10a builds the learning model through the machine learning, and selects the picking position by use of the built learning model, by using the three-dimensional point group information of the clipped-out candidate picking position as input data in the learning model, and using the evaluation value imparted to the three-dimensional point group information as a label.

On the other hand in the second embodiment, the pre-processing such as the matching and the clipping-out is omitted, and the entire range image acquired from the three-dimensional measuring device 40 is used as input data in the learning model, thereby building the learning model through the machine learning, and selecting the picking position by use of the built learning model.

Depending on the environment applied to the second embodiment, such omission of the pre-processing enables to perform efficient arithmetic processing and facilitate mounting in the second embodiment. In the second embodiment, the entire range image is used as input data in the learning model as described above, thereby enabling to consider influence among pixels far away with each other in the image.

<Functional Blocks of Image Processing Apparatus 10b>

Figure 10:
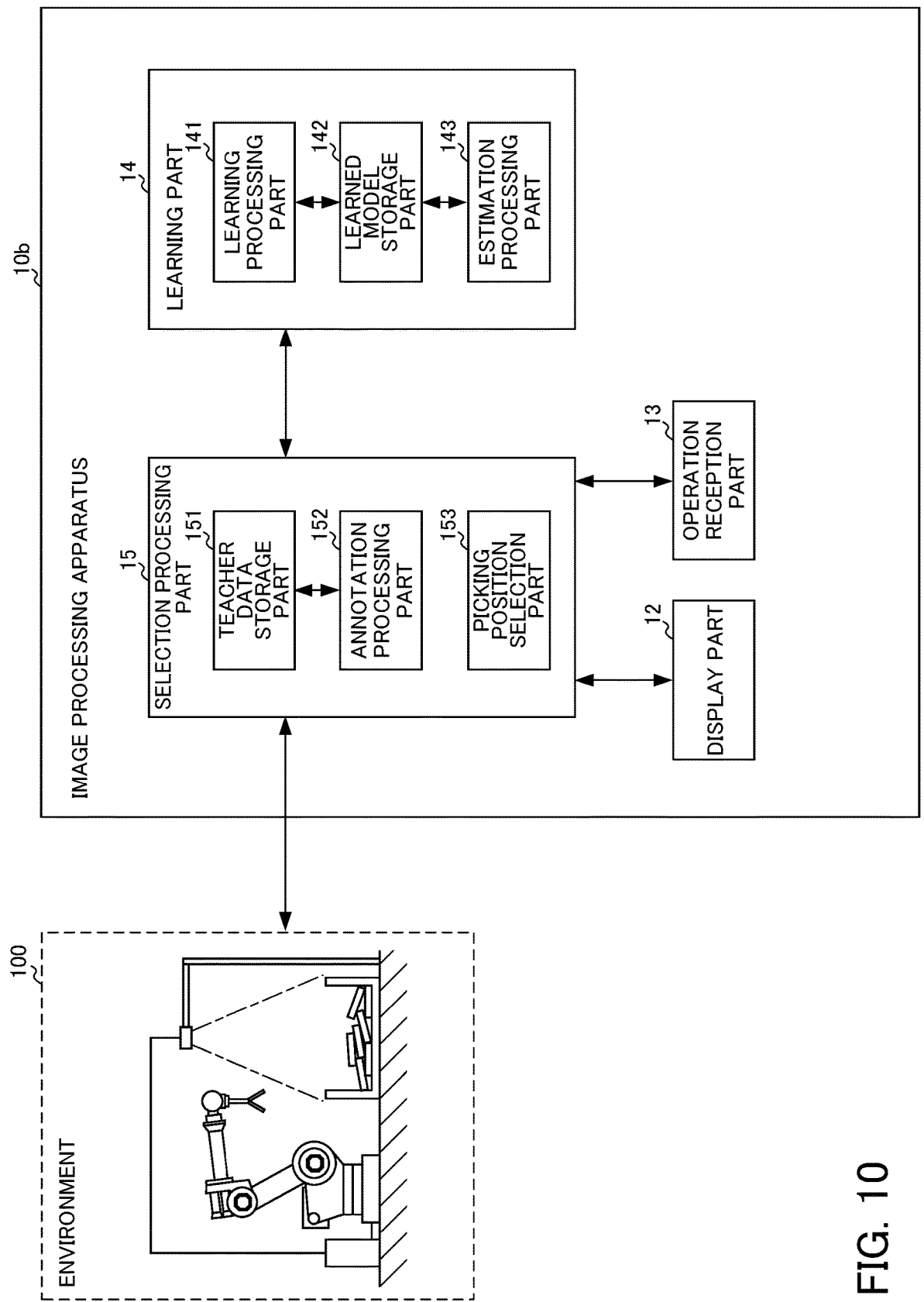
FIG. 10 is a block diagram illustrating the functional blocks of an image processing apparatus in a second embodiment of the present invention.

The following descriptions are given with reference to FIG. 10, of the functional blocks which are included in the image processing apparatus 10b so that the entire range image is used as input data in the learning model, without such pre-processing. It is noted that, in FIG. 10 as in FIG. 2, constituent elements other than the image processing apparatus 10b in the robot system 1b are collectively illustrated as the environment 100.

The image processing apparatus 10b is different from the image processing apparatus 10a in that a selection processing part 15 is substituted for the selection processing part 11 included in the image processing apparatus 10a. In other words, the image processing apparatus 10b includes the selection processing part 15, the display part 12, the operation reception part 13, and the learning part 14. The selection processing part 15 includes a teacher data storage part 151, an annotation processing part 152, and a picking position selection part 153.

The teacher data storage part 151 is a unit for storing teacher data for the machine learning. The range image input by the three-dimensional measuring device 40 is stored in the teacher data storage part 151 as input data in the teacher data. The label generated by the annotation processing part 152 is stored in the teacher data storage part 151 as input data in the teacher data. The input data and the label are associated with each other when the annotation processing part 152 stores the label.

The annotation processing part 152 is a unit for generating the label included in the teacher data. The annotation processing part 152 acquires the range image from the teacher data storage part 151 to generate the label. The annotation processing part 152 makes the display part 12 display the acquired range image. A display example of the range image is as described above with reference to FIG. 4.

The user referring to the displayed range image teaches the picking position in the same manner as in the first embodiment. Specifically, the user designates the picking position by using the operation reception part 13 realized by a mouse or a touch panel, thereby teaching the picking position.

The operation reception part 13 notifies the annotation processing part 152 of the teaching position which is the taught picking position. The annotation processing part 152 draws the notified teaching position on the range image, so that the user is able to recognize the teaching position. Such drawing is performed by a method, for example, a method of differently coloring the pixels of the teaching position on the range image, so that the user easily recognizes the position. A display example in which such drawing is performed is as described above with reference to FIG. 5.

In the first embodiment, the user teaches the picking position with a point. While in the second embodiment, the user teaches the picking position as a predetermined region. In an example, in the second embodiment, the user teaches the picking position by coloring a region capable of picking-up.

The annotation processing part 152 generates, on the basis of the teaching by the user, an image to which an attribute, is assigned, indicating whether or not each pixel included in the entire range image corresponds to the picking position (that is, teaching position) of the workpiece 50 (for example, "1" indicating the picking position of the workpiece 50, and "0" indicating a position other than the picking position of the workpiece 50). Hereinafter, the image is referred to as a "label map."

In the second embodiment, the label map is used as a label. When generating the label map, the annotation processing part 152 may assign to each 1/s (s is an arbitrary natural number) pixel an attribute indicating whether or not the 1/s pixel corresponds to the picking position of the workpiece 50, by further increasing resolution up to 1/s, instead of assigning to each pixel an attribute indicating whether or not the pixel corresponds to the picking position of the workpiece 50. Since the three-dimensional point group information is not required as a label, the three-dimensional point group information included in the range image may be omitted in the label map. Accordingly, the label map is an image including information of a two-dimensional coordinate of each pixel (or each 1/s pixel) and information of an attribute indicating whether or not each pixel (or each 1/s pixel) corresponds to the picking position of the workpiece 50, in the range image.

The annotation processing part 152 generates the teacher data by using the generated label map as a label and using the range image used for the teaching from the user as input data, and associating the both with each other. Then, the annotation processing part 152 stores the generated teacher data in the teacher data storage part 151. It is noted that the annotation processing part 152 may separately stores the input data and the label in the teacher data storage part 151 and link the both, thereby using them as teacher data, instead of storing the both in the teacher data storage part 151 in association with each other. The learning processing part 141 in the second embodiment uses the teacher data stored in the teacher data storage part 151, when performing the machine learning. Specifically, in the second embodiment, when the range image is used as input, the learning model for outputting an image similar to the label map is built through the machine learning by the learning processing part 141. That is, such a learning model is built, for outputting an image obtained by segmenting a region capable of picking-up.

The machine learning may be realized by, for example, a method of inputting an image and performing some type of estimation (for example, classification) to all the pixels in the image. Examples of such a method include Semantic Segmentation. Semantic Segmentation, which is a technique aimed at application to automated driving of vehicles, enables to distinguish by color respective regions such as of a vehicle and a pedestrian, by using image data of, for example, a photograph as input. In the second embodiment, as described above, the machine learning is performed by using a range image as input data and an annotation to the range image (for example, an image in which a human colors a position where the workpiece 50 is likely to be picked up) as a label, thereby enabling to perform estimation of evaluation values for all the pixels at once. Accordingly, the pre-processing such as of the matching processing and the clipping processing in the first embodiment is able to be omitted.

Specifically, a convolutional encoder-decoder disclosed in, for example, the following reference may be used to realize the machine learning in the second embodiment.

REFERENCE

Vijay Badrinarayanan, Alex Kendall, Roberto Cipolla, "SegNet: A Deep Convolutional Encoder-Decoder Architecture for Image Segmentation," [online], Aug. 10, 2016, [Searched on Sep. 10, 2017], Website <URL:Https://arxiv.org/pdf/1511.00561.pdf>

The learning processing part 141 builts a learned model through the machine learning. Then, the learning processing part 141 stores the built learned model in the learned model storage part 142.

The picking position selection part 153 is a unit for selecting the picking position on the basis of the evaluation value map output by the estimation processing part 143. The descriptions are given below, of the selection of the picking position by the picking position selection part 153 and the details of the evaluation value map. Upon acquiring the range image from the three-dimensional measuring device 40 to select the picking position, the picking position selection part 153 outputs the acquired range image to the estimation processing part 143. The estimation processing part 143 inputs the input range image as input data in the learned model stored in the learned model storage part 142. In response to the input, an image obtained by segmenting a region capable of picking-up is output from the learned model. The output image is called an "evaluation value map."

The evaluation value map, which has the same data structure as that of the label map, is an image including information of a two-dimensional coordinate of each pixel (or each 1/s pixel) and information of an attribute indicating whether or not each pixel (or each 1/s pixel) corresponds to the picking position of the workpiece 50. The estimation processing part 143 outputs the evaluation value map to the picking position selection part 153.

The picking position selection part 153 selects the picking position of the workpiece 50 on the basis of the evaluation value map. Specifically, each segment segmented as the picking position of the workpiece 50 is taken as a candidate picking position. Then, the picking position selection part 153 designates the region corresponding to the candidate picking position on the range image used as input data, on the basis of the coordinate information indicating the region of the candidate picking position. Then, the picking position selection part 153 selects the picking position by performing known point group processing and/or image processing with respect to the designated region.

The picking position selection part 153 outputs the selected picking position to the robot controller 20. Thereafter, as in the first embodiment, the robot controller 20 generates a control signal on the basis of the picking position. Then, the robot 30 picks up the workpiece 50 by the hand on the basis of the control signal.

In the second embodiment with the configuration described above, the pre-processing such as of the matching and the clipping-out is omitted, and the entire range image acquired from the three-dimensional measuring device 40 is used as input data in the learning model, thereby enabling to build the learning model through the machine learning and select the picking position by use of the built learning model.

<Operation in Second Embodiment>

The operation in the second embodiment is described below with reference to the flowchart of FIG. 11. In step S31, the teacher data storage part 151 stores the range image generated by measuring the workpieces 50 in bulk by the three-dimensional measuring device 40. In step S32, the annotation processing part 152 makes the display part 12 display the range image stored in the teacher data storage part 151. In step S33, the annotation processing part 152 draws the teaching position on the range image on the basis of the teaching of the picking position received from the user by the operation reception part 13.

In step S34, the annotation processing part 152 generates the label map on the basis of the teaching from the user. The annotation processing part 152 stores the label map and the range image as teacher data in the teacher data storage part 151.

In step S35, the learning processing part 141 performs the learning, by using the range image as input data and the label map corresponding to the range image as a label, stored as the teacher data in the teacher data storage part 151. As a result, the learned model is built and stored in the learned model storage part 142.

In step S36, the picking position selection part 153 acquires the range image generated by measuring the workpieces 50 in bulk, from the three-dimensional measuring device 40. Then, the picking position selection part 153 outputs the acquired range image to the estimation processing part 143.

In step S37, the estimation processing part 143 inputs the input range image in the learned model stored in the learned model storage part 142. Then, the estimation processing part 143 acquires the evaluation value map as output from the learned model. The estimation processing part 143 outputs the acquired evaluation value map to the picking position selection part 153.

In step S38, the picking position selection part 153 selects the picking position on the basis of the evaluation value map. The picking position selection part 153 transmits the selected picking position to the robot controller 20.

In step S39, the robot controller 20 controls the robot 30 on the basis of the received picking position so that picking up of the workpiece 50 is performed. It is noted that in the case where the plurality of workpieces 50 are to be picked up, the plurality of picking positions may be selected in step S38, and the picking-up may be performed for each of the plurality of picking positions in step S39. However, since the state of the workpieces 50 in bulk is changed upon the picking-up of the workpiece 50, the processing may be repeated by returning back to step S36 every time the workpiece 50 is picked up.

In the second embodiment with the configuration described above, the pre-processing such as of the matching and the clipping-out is omitted, and the entire range image acquired from the three-dimensional measuring device 40 is used as input data in the learning model, thereby enabling to build the learning model through the machine learning and select the picking position by use of the built learning model.

<Collaboration of Hardware and Software>

It is noted that each of the devices included in the robot system described above is able to be realized by hardware, software, or the combination thereof. The machine learning method performed by the collaboration of respective devices included in the robot system described above is also able to be realized by hardware, software, or the combination thereof. Realization by software herein means that a computer reads and executes a program, thereby performing realization.

A program may be stored by use of various types of non-transitory computer readable media, and supplied to a computer. The non-transitory computer readable media herein include various types of tangible storage media. Examples of the non-transitory computer readable media include a magnetic recording medium (e.g. flexible disk, magnetic tape, hard disk drive), a magneto-optical recording medium (e.g. magneto-optical disk), CD-ROM (Read Only Memory), CD-R, CD-R/W, semiconductor memory (e.g. Mask ROM, PROM (Programmable ROM), EPROM (Erasable PROM), flash ROM, and RAM (random access memory)). The program may be supplied to a computer by various types of transitory computer readable media. Examples of the transitory computer readable media include an electrical signal, an optical signal, and an electromagnetic wave. A transitory computer readable medium is capable of supplying a program to a computer via a wired communication path such as a wire and an optical fiber, or a wireless communication path.

<Modifications of Embodiments>

Although each of the above-described embodiments is a preferred embodiment of the present invention, the scope of the present invention is not limited only to the above-described embodiments. Some of the embodiments may be combined, and various modifications are available within the scope without departing from the gist of the present invention.

<Modification 1>

In each of the embodiments described above, the image processing apparatus 10a or the image processing apparatus 10b and the robot controller 20 are provided separately. Alternatively, these apparatuses may be provided integrally.

<Modification 2>

In each of the embodiments described above, the robot controller 20 and the image processing apparatus 10a or the image processing apparatus 10b are illustrated so as to be located closely. Alternatively, they may be located far away from each other, via a network such as a LAN (Local Area Network) or the Internet.

One unit of the image processing apparatus 10a or the image processing apparatus 10b may be connected to the plurality of robot controllers 20. Then, the one unit of the image processing apparatus 10a or the image processing apparatus 10b may perform the learning on the basis of the teacher data acquired from each of the plurality of robot controllers 20.

<Modification 3>

In the description of each of the above-described embodiments, the three-dimensional measuring device 40 is fixedly disposed at a predetermined position. Alternatively, the three-dimensional measuring device 40 may not necessarily be fixed at a predetermined position. As long as the three-dimensional measuring device 40 grasps the position in the machine coordinate system to control the robot 30, the set position of the three-dimensional measuring device 40 may be shifted during operation, for example, as in the case where the three-dimensional measuring device 40 is attached to the arm of the robot 30.

<Modification 4>

In the assumption of each of the above-described embodiments, the image processing apparatus 10a or the image processing apparatus 10b is realized by one unit of apparatus. Alternatively, a distributed processing system may be provided, in which respective functions of the image processing apparatus 10a or the image processing apparatus 10b are appropriately distributed to a plurality of devices. In an example, such a distributed processing system may be provided, in which the function of the selection processing part 11 of the image processing apparatus 10a or the function of the selection processing part 15 of the image processing apparatus 10b and the function of the learning part 14 are appropriately distributed to a plurality of devices. In this case, such a distributed processing system may be provided, in which the respective functions included in the learning part 14 are appropriately distributed by a block unit to a plurality of devices. The respective functions of the image processing apparatus 10a or the image processing apparatus 10b may be realized by using a virtual server function on the cloud or the like.

<Modification 5>

In the above-described first embodiment, the matching processing is performed, and the learned model is built on the basis of the success or failure of the result in the picking-up actually tried at the matched position. Thereafter, the clipping processing is performed, by using the learning model built through the matching processing as described above. Alternatively, in the case where the clipping processing is performed, the learning model built through the matching processing may not necessarily be used.

In this case, the learning processing part 141 builds the learning model by assuming that the picking-up at the teaching point taught by the user succeeds. That is, the learning part 14 generates the teacher data by using the teaching position peripheral image data as input data, and using as a label the evaluation value indicating that the picking-up has succeeded (is assumed to have succeeded). Then, the learning processing part 141 builds the learning model through the learning based on the teacher data.

The selection processing part 11 is capable of performing the clipping processing, by using the learning model built in such a way. Accordingly, the selection processing part 11 builds the learning model without performing the matching processing or the actual picking-up, thereby enabling to select the picking position.

It is noted that in this case, the learning processing part 141 may acquire non-teaching position peripheral image data which is peripheral data of a position (non-teaching position) different from the teaching position from the user. Then, the learning processing part 141 may generate the teacher data indicating a failure example, by using the non-teaching position peripheral image data as input data, and using as a label the evaluation value indicating that the picking-up has failed (is assumed to have failed). Then, the learning processing part 141 may perform the learning by further using the teacher data indicating the failure example. In this case, the non-teaching position may be selected by the user, or may be selected at random from positions other than the teaching position.

EXPLANATION OF REFERENCE NUMERALS 1a, 1b ROBOT SYSTEM
10a, 10b IMAGE PROCESSING APPARATUS
11 SELECTION PROCESSING PART
111 SELECTION DATA STORAGE PART
112 ANNOTATION PROCESSING PART
113 MATCHING PART
114 CLIPPING PART
12 DISPLAY PART
13 OPERATION RECEPTION PART
14 LEARNING PART
141 LEARNING PROCESSING PART
142 LEARNED MODEL STORAGE PART
143 ESTIMATION PROCESSING PART
15 SELECTION PROCESSING PART
151 TEACHER DATA STORAGE PART
152 ANNOTATION PROCESSING PART
153 PICKING POSITION SELECTION PART
20 ROBOT CONTROLLER
30 ROBOT
40 THREE-DIMENSIONAL MEASURING DEVICE
50 WORKPIECE
60 CONTAINER

What is claimed is:

1. An image processing apparatus comprising:
at least one memory; and
at least one processor configured to:
acquire, from a user, before learning of a learning model has been completed, a teaching of a position in an image including a plurality of objects in order to learn the learning model, the position taught serving for selecting at least one object from the plurality of objects, the selected at least one object to be picked up by a robot;
impart an evaluation value, based on at least one of the teaching or a result of the picking up the selected at least one object based on the teaching, to information of the selected at least one object at least at the position taught; and
learn the learning model that outputs an evaluation value for picking up an object on information inputted, by performing machine learning using the information of the selected at least one object and using the imparted evaluation value as a label.

2. The image processing apparatus according to claim 1, wherein
the information of the selected at least one object is point group information of the selected at least one object.

3. The image processing apparatus according to claim 2, wherein
a range size of a point group to be inputted to the learning model is set in advance based on a size of the selected at least one object to be picked up.

4. The image processing apparatus according to claim 1, wherein
the teaching indicates the position by a point or an area.

5. The image processing apparatus according to claim 1, wherein
the at least one processor imparts, as the imparted evaluation value, a lower evaluation value in a case of failing in picking up than in a case of succeeding in picking up.

6. The image processing apparatus according to claim 1, wherein
the evaluation value to be outputted by the learning model is information indicating a region in which picking up is possible, in the information inputted.

7. The image processing apparatus according to claim 1, wherein
the learning model is a neural network.

8. The image processing apparatus according to claim 1, wherein
the result of the picking up the selected at least one object based on the teaching is acquired by the robot trying to pick up the selected at least one object at the position taught.

9. The image processing apparatus according to claim 1, wherein
the imparted evaluation value is imparted to the information of the selected at least one object, based on success or failure in picking up the selected at least one object based on the teaching.

10. The image processing apparatus according to claim 1, wherein
the at least one processor imparts the imparted evaluation value depending on time taken for the picking up.

11. The image processing apparatus according to claim 1, wherein
the learning model outputs, as the evaluation value, an image obtained by segmenting a region in which picking up is possible.

12. A robot system comprising:
the robot;
the image processing apparatus according to claim 1; and
a robot controller that controls a picking-up operation of an object by the robot, based on the evaluation value outputted by the learning model of the image processing apparatus.

13. The robot system according to claim 12, wherein
the image processing apparatus determines a picking-up position of the object based on the evaluation value outputted by the learning model, and
the robot controller controls the picking-up operation of the object by the robot, based on the determined picking-up position.

14. The robot system according to claim 12, further comprising:
a measuring device that acquires information of the object.

15. The robot system according to claim 14, wherein
the measuring device is any one of a range image sensor or a stereo camera.

16. The robot system according to claim 14, wherein
the measuring device is attached to the robot.

17. The robot system according to claim 12, wherein
the image processing apparatus and the robot controller are configured as a single device.

18. The image processing apparatus according to claim 1, wherein the information of the selected at least one object includes point group information of the taught position and a periphery of the taught position.

19. A machine learning method performed by an image processing apparatus, the machine learning method comprising:
acquiring, from a user, before learning of a learning model has been completed, a teaching of a position in an image including a plurality of objects in order to learn the learning model, the position taught serving for selecting at least one object from the plurality of objects, the selected at least one object to be picked up by a robot;
imparting an evaluation value based on at least one of the teaching or a result of the picking up the selected at least one object based on the teaching, to information of the selected at least one object at least at the position taught; and
learning the learning model that outputs an evaluation value for picking up an object on information inputted, by performing machine learning using the information of the selected at least one object and using the imparted evaluation value as a label.

20. The machine learning method according to claim 19, wherein
the imparted evaluation value is imparted to the information of the selected at least one object, based on success or failure in picking up the selected at least one object based on the teaching.

21. The machine learning method according to claim 19, wherein the information of the selected at least one object includes point group information of the taught position and a periphery of the taught position.

22. A non-transitory computer readable medium storing a machine learning program for causing an image processing apparatus to execute a machine learning method comprising:
acquiring, from a user, before learning of a learning model has been completed, a teaching of a position in an image including a plurality of objects in order to learn the learning model, the position taught serving for selecting at least one object from the plurality of objects, the selected at least one object to be picked up by a robot;
imparting an evaluation value based on at least one of the teaching or a result of the picking up the selected at least one object based on the teaching, to information of the selected at least one object at least at the position taught; and
learning the learning model that outputs an evaluation value for picking up an object on information inputted, by performing machine learning using the information of the selected at least one object and using the imparted evaluation value as a label.

* * * * *